United States Patent
Miyake et al.

(10) Patent No.: US 9,411,544 B2
(45) Date of Patent: Aug. 9, 2016

(54) PRINTING APPARATUS AND PRINT CONTROL METHOD CONTROLLING PRINTING BASED ON ACQUIRED INFORMATION RELATING TO CONVEYANCE OF A PRINT MEDIUM

(71) Applicant: CANON KABUSHIKI KAISHA, Tokyo (JP)

(72) Inventors: Nobutaka Miyake, Yokohama (JP); Shinjiro Hori, Yokohama (JP); Hiromitsu Akiba, Yokohama (JP); Junichi Nakagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/807,640

(22) Filed: Jul. 23, 2015

(65) Prior Publication Data
US 2016/0034231 A1    Feb. 4, 2016

(30) Foreign Application Priority Data

Jul. 30, 2014  (JP) ................................ 2014-154964

(51) Int. Cl.
*G06F 3/12* (2006.01)
*G06K 15/00* (2006.01)
(Continued)

(52) U.S. Cl.
CPC ............ *G06F 3/1208* (2013.01); *G06F 3/1243* (2013.01); *G06K 15/1889* (2013.01); *G06K 15/4065* (2013.01); *H04N 1/32149* (2013.01)

(58) Field of Classification Search
CPC . H04N 1/32352; H04N 1/32208; B41M 3/10; G06K 19/06131; G06T 1/0021; G06T 2201/005; H04L 2209/608
See application file for complete search history.

(56) References Cited

U.S. PATENT DOCUMENTS 5,928,471 A * 7/1999 Howland ................. B41M 3/14
162/110
6,236,827 B1 * 5/2001 Hada ...................... H04N 1/506
399/301
(Continued)

FOREIGN PATENT DOCUMENTS

JP   2004-223854   8/2004
JP   2010-274483   12/2010

OTHER PUBLICATIONS

U.S. Appl. No. 14/807,631, filed Jul. 23, 2015.
(Continued)

*Primary Examiner* — Ted Barnes
(74) *Attorney, Agent, or Firm* — Fitzpatrick, Cella, Harper & Scinto

(57) ABSTRACT

There is provided a printing apparatus for conveying a print medium and performing printing on the conveyed print medium, the printing apparatus including a print data acquisition unit configured to acquire print data in which digital watermark information is added to image data, the digital watermark information being used to identify a position of an image of the image data on a print medium, a printing unit configured to print an image on a print medium based on the print data, a conveyance information acquisition unit configured to acquire information relating to conveyance of a print medium, based on information on the position of the image that is obtained by detection of digital watermark information in an image read by a reading unit, and a print control unit configured to control printing by the printing unit, based on the acquired information relating to conveyance.

17 Claims, 27 Drawing Sheets

(51) Int. Cl.
*G06K 15/02* (2006.01)
*H04N 1/32* (2006.01)

(56) References Cited

U.S. PATENT DOCUMENTS

| | | | | |
|---|---|---|---|---|
| 6,295,435 B1* | 9/2001 | Shinohara | H04N 1/047 | 250/559.44 |
| 6,369,842 B1* | 4/2002 | Abramsohn | G03G 5/144 | 347/116 |
| 6,380,960 B1* | 4/2002 | Shinohara | H04N 1/506 | 347/116 |
| 6,744,906 B2* | 6/2004 | Rhoads | G06T 1/0071 | 358/3.28 |
| 6,930,802 B2* | 8/2005 | Sugaya | B41J 11/706 | 242/418.1 |
| 7,031,493 B2* | 4/2006 | Fletcher | G06T 1/0028 | 382/100 |
| 7,448,710 B2* | 11/2008 | Kusunoki | B41J 2/145 | 347/12 |
| 7,489,796 B2* | 2/2009 | Nakamura | G06T 1/0064 | 382/100 |
| 7,539,325 B2* | 5/2009 | Rhoads | G06T 1/0071 | 358/3.28 |
| 8,157,345 B2* | 4/2012 | Sasayama | B41J 29/393 | 347/14 |
| 8,780,363 B2* | 7/2014 | Omoto | B41J 11/425 | 358/1.1 |
| 8,913,282 B2* | 12/2014 | Murayama | G06K 15/002 | 358/1.2 |
| 9,083,836 B2* | 7/2015 | Inoue | H04N 1/00689 | |
| 9,277,063 B2* | 3/2016 | Kido | H04N 1/00013 | |
| 2001/0004425 A1* | 6/2001 | Shinohara | H04N 1/4078 | 399/301 |
| 2001/0035978 A1* | 11/2001 | Sugaya | B41J 11/706 | 358/304 |
| 2002/0145759 A1* | 10/2002 | Miller | G06T 1/0028 | 358/3.28 |
| 2003/0150922 A1* | 8/2003 | Hawes | G06F 3/0317 | 235/494 |
| 2004/0128512 A1* | 7/2004 | Sharma | G06Q 20/3823 | 713/176 |
| 2005/0206950 A1 | 9/2005 | Ushiro | | |
| 2005/0280665 A1* | 12/2005 | Flotats | B41J 11/0095 | 347/8 |
| 2005/0285922 A1* | 12/2005 | Suzuki | G03G 15/0184 | 347/116 |
| 2005/0286088 A1* | 12/2005 | Takagi | H04N 1/32229 | 358/3.28 |
| 2007/0223022 A1* | 9/2007 | Suzuki | B41J 3/4075 | 358/1.12 |
| 2007/0242317 A1* | 10/2007 | Hashiguchi | G03F 7/70791 | 358/474 |
| 2008/0006163 A1* | 1/2008 | Schwitzky | B65H 9/00 | 101/177 |
| 2010/0149248 A1* | 6/2010 | Enomoto | B41J 3/543 | 347/19 |
| 2010/0214347 A1* | 8/2010 | Sasayama | B41J 29/393 | 347/19 |
| 2012/0243014 A1* | 9/2012 | Goto | G03G 15/0194 | 358/1.12 |
| 2014/0064747 A1* | 3/2014 | Numazu | G03G 15/5062 | 399/19 |
| 2014/0104335 A1* | 4/2014 | Kawatoko | B41J 2/2121 | 347/9 |
| 2014/0111817 A1* | 4/2014 | Shimizu | B41J 2/2146 | 358/1.8 |
| 2014/0240800 A1* | 8/2014 | Murayama | H04N 1/028 | 358/496 |
| 2015/0124270 A1* | 5/2015 | Megawa | H04N 1/32133 | 358/1.9 |
| 2016/0031249 A1* | 2/2016 | Akiba | B41J 29/38 | 347/110 |

OTHER PUBLICATIONS

U.S. Appl. No. 14/807,649, filed Jul. 23, 2015.

* cited by examiner

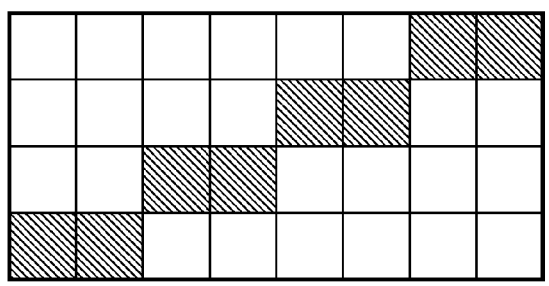 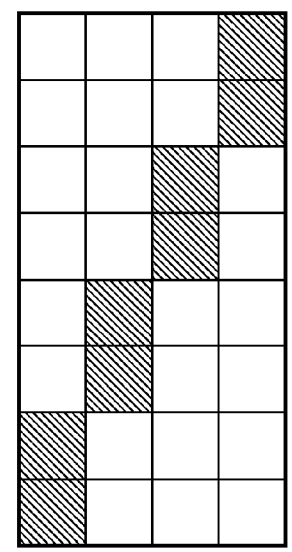
FIG.10A  FIG.10B

SPATIAL FILTER A

|    |    |    | -1 | -1 |
|----|----|----|----|----|
|    | -1 | -1 | 2  | 2  |
| -1 | 2  | 2  | -1 | -1 |
| 2  | -1 | -1 |    |    |
| -1 |    |    |    |    |

FIG.13A

SPATIAL FILTER B

|    |    | -1 | 2 | -1 |
|----|----|----|---|----|
|    |    | -1 | 2 | -1 |
|    | -1 | 2  | -1 |   |
|    | -1 | 2  | -1 |   |
| -1 | 2  | -1 |   |   |

FIG.13B

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG.16

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

FIG.17

| 2  | -1 |    |    |    |
|----|----|----|----|----|
| -1 | 2  | -1 |    |    |
|    | -1 | 2  | -1 |    |
|    |    | -1 | 2  | -1 |
|    |    |    | -1 | 2  |

FIG.23A

|    |    |    | -1 | 2  |
|----|----|----|----|----|
|    |    | -1 | 2  | -1 |
|    | -1 | 2  | -1 |    |
| -1 | 2  | -1 |    |    |
| 2  | -1 |    |    |    |

FIG.23B

| 0 | 1 | 2 | 3 | 0 | 1 | 2 | 3 | 0 | 1 | 2 | 3 | 0 | 1 | 2 | 3 |
|---|---|---|---|---|---|---|---|---|---|---|---|---|---|---|---|
| 3 | 0 | 1 | 2 | 3 | 0 | 1 | 2 | 3 | 0 | 1 | 2 | 3 | 0 | 1 | 2 |
| 2 | 3 | 0 | 1 | 2 | 3 | 0 | 1 | 2 | 3 | 0 | 1 | 2 | 3 | 0 | 1 |
| 1 | 2 | 3 | 0 | 1 | 2 | 3 | 0 | 1 | 2 | 3 | 0 | 1 | 2 | 3 | 0 |
| 0 | 1 | 2 | 3 | 0 | 1 | 2 | 3 | 0 | 1 | 2 | 3 | 0 | 1 | 2 | 3 |
| 3 | 0 | 1 | 2 | 3 | 0 | 1 | 2 | 3 | 0 | 1 | 2 | 3 | 0 | 1 | 2 |
| 2 | 3 | 0 | 1 | 2 | 3 | 0 | 1 | 2 | 3 | 0 | 1 | 2 | 3 | 0 | 1 |
| 1 | 2 | 3 | 0 | 1 | 2 | 3 | 0 | 1 | 2 | 3 | 0 | 1 | 2 | 3 | 0 |
| 0 | 1 | 2 | 3 | 0 | 1 | 2 | 3 | 0 | 1 | 2 | 3 | 0 | 1 | 2 | 3 |
| 3 | 0 | 1 | 2 | 3 | 0 | 1 | 2 | 3 | 0 | 1 | 2 | 3 | 0 | 1 | 2 |
| 2 | 3 | 0 | 1 | 2 | 3 | 0 | 1 | 2 | 3 | 0 | 1 | 2 | 3 | 0 | 1 |
| 1 | 2 | 3 | 0 | 1 | 2 | 3 | 0 | 1 | 2 | 3 | 0 | 1 | 2 | 3 | 0 |
| 0 | 1 | 2 | 3 | 0 | 1 | 2 | 3 | 0 | 1 | 2 | 3 | 0 | 1 | 2 | 3 |
| 3 | 0 | 1 | 2 | 3 | 0 | 1 | 2 | 3 | 0 | 1 | 2 | 3 | 0 | 1 | 2 |
| 2 | 3 | 0 | 1 | 2 | 3 | 0 | 1 | 2 | 3 | 0 | 1 | 2 | 3 | 0 | 1 |
| 1 | 2 | 3 | 0 | 1 | 2 | 3 | 0 | 1 | 2 | 3 | 0 | 1 | 2 | 3 | 0 |

FIG.24

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |

FIG.25

PRINTING APPARATUS AND PRINT CONTROL METHOD CONTROLLING PRINTING BASED ON ACQUIRED INFORMATION RELATING TO CONVEYANCE OF A PRINT MEDIUM

BACKGROUND OF THE INVENTION

1. Field of the Invention

The present invention relates to a printing apparatus and a print control method, and more particularly, to a technique of detecting a predetermined pattern printed on a conveyed print medium and acquiring an amount of conveyance of a print medium.

2. Description of the Related Art

Japanese Patent Laid-Open No. 2010-274483 discloses printing, in a predetermined position of a print medium, a cross pattern formed of a plurality of dots as a predetermined pattern for detection. This document also discloses that it is preferable that the pattern be printed in a color tone that does not affect the quality of a printed image. According to print medium conveyance control having such a configuration as disclosed in Japanese Patent Laid-Open No. 2010-274483, it is possible to convey a print medium to a target position in the conveyance by using a result of detection of the pattern in a fixed position.

However, as disclosed in Japanese Patent Laid-Open No. 2010-274483, even with consideration of the color tone of the pattern that does not affect the quality of a printed image, this may not be sufficient. More specifically, in Japanese Patent Laid-Open No. 2010-274483, since dots for a pattern are applied in addition to the dots forming the printed image, the pattern may be visually recognized in the printed image depending on the density of the printed image, or conversely, the density of the pattern. This may lead to a poor image quality.

SUMMARY OF THE INVENTION

An object of the present invention is to provide a printing apparatus and a print control method capable of printing a detection pattern used in print control, which is not easily visually recognized in an image printed on a print medium.

In a first aspect of the present invention, there is provided a printing apparatus for conveying a print medium and performing printing on the conveyed print medium, the printing apparatus comprising: a print data acquisition unit configured to acquire print data in which digital watermark information is added to image data, the digital watermark information being used to identify a position of an image of the image data on a print medium; a printing unit configured to print an image on a print medium based on the print data; a conveyance information acquisition unit configured to acquire information relating to conveyance of a print medium, based on information on the position of the image that is obtained by detection of digital watermark information in an image read by a reading unit; and a print control unit configured to control printing by the printing unit, based on the acquired information relating to conveyance.

In a second aspect of the present invention, there is provided a print control method for a printing apparatus for conveying a print medium and performing printing on the conveyed print medium, the print control method comprising: a print data acquisition step of acquiring print data in which digital watermark information is added to image data, the digital watermark information being used to identify a position of an image of the image data on a print medium; a printing step of printing an image on a print medium based on the print data; a conveyance information acquisition step of acquiring information relating to conveyance of a print medium, based on information on the position of the image that is obtained by detection of digital watermark information in an image read by a reading unit; and a print control step of controlling printing in the printing step, based on the acquired information relating to conveyance.

According to the above configuration, it is possible to print a detection pattern used in print control, which is not easily visually recognized in an image printed on a print medium.

Further features of the present invention will become apparent from the following description of exemplary embodiments (with reference to the attached drawings).

BRIEF DESCRIPTION OF THE DRAWINGS

FIG. 10A and FIG. 10B are views illustrating quantization conditions A and B, respectively, set in the processing shown in FIG. 8;

FIG. 13A and FIG. 13B are views showing an example of a spatial filter A and an example of a spatial filter B according to the present embodiment, respectively;

FIG. 16 is a table showing thinning by the thinning part shown in FIG. 11;

FIG. 17 is also a table showing thinning by the thinning part shown in FIG. 11;

FIG. 23A and FIG. 23B are views showing spatial filters according to the second embodiment;

FIG. 24 is a view showing details of the spatial filter shown in FIG. 23A;

FIG. 25 is a view showing details of the spatial filter shown in FIG. 23B;

DESCRIPTION OF THE EMBODIMENTS

Embodiments of the present invention will now be described with reference to the attached drawings.

(First Embodiment)

Figure 1:
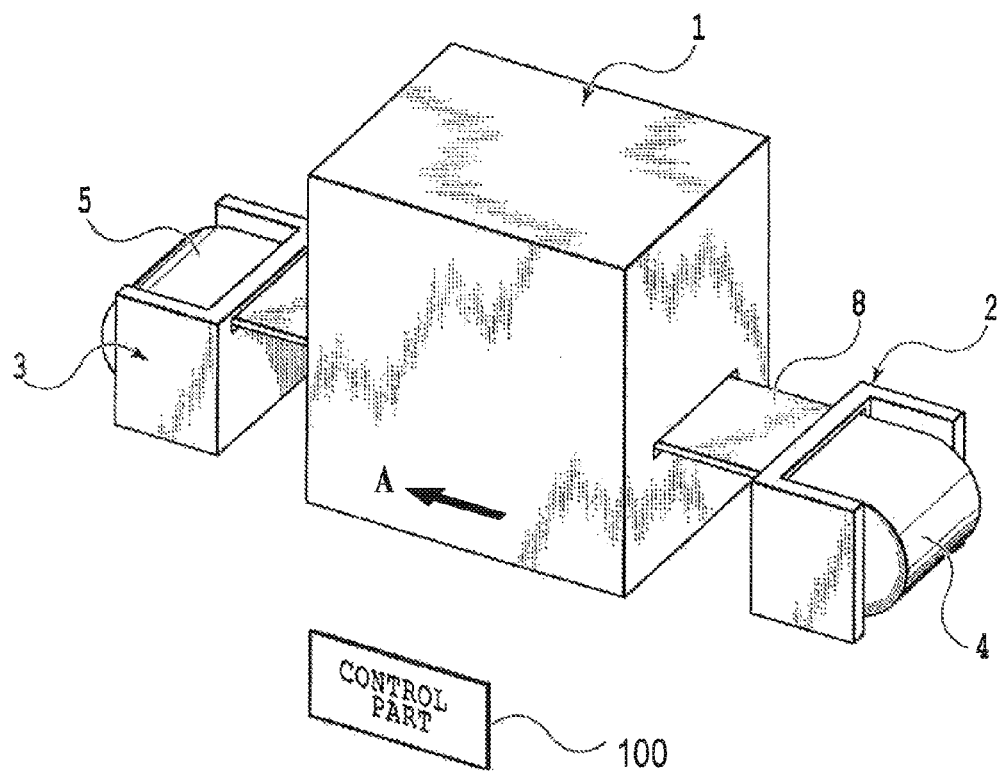
FIG. 1 is a perspective view showing a schematic structure of a printing apparatus according to one embodiment of the present invention.

FIG. 1 is a perspective view showing a schematic structure of an ink jet printing apparatus according to one embodiment of the present invention. The printing apparatus according to the present embodiment performs relatively high-speed printing by using a long continuous sheet as a print medium, and is suitable for printing a large number of images in, for example, a print laboratory or the like.

As shown in FIG. 1, the printing apparatus of the present embodiment generally includes a printing part 1, a sheet feeding part 2, and a sheet winding-up part 3. While holding a roll sheet 4 wound in a roll, the sheet feeding part 2 draws a sheet 8 from the roll and supplies it to the printing part 1. The printing part 1 sequentially prints an image for each page on the conveyed sheet 8. The printed sheet 8 is wound up as a roll sheet 5 by the sheet winding-up part 3. The control of the above operation and the processing are performed by a control part 100 of the printing apparatus. It should be noted that in any position of a sheet conveying path, a position closer to the sheet feeding part 2 will be called "upstream" and a position in the opposite side will be called "downstream."

Figure 2A:
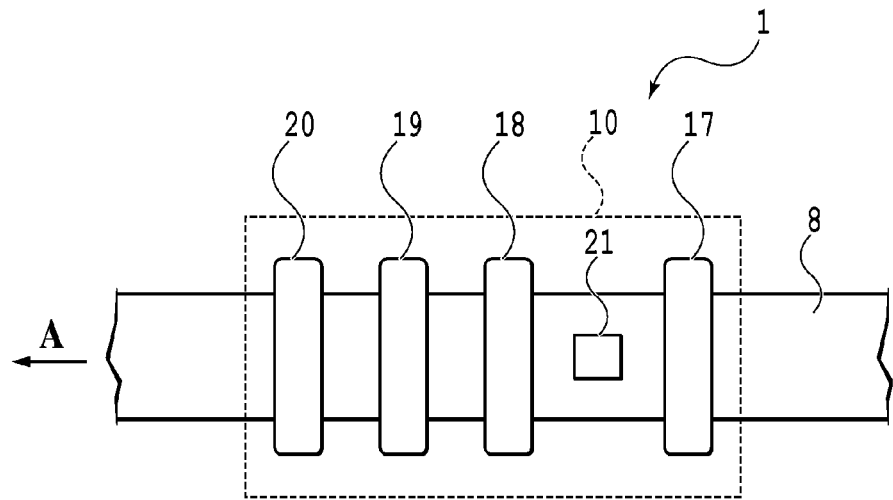
FIG. 2A and FIG. 2B are a top view and a side view, respectively, showing a detailed structure of a printing part of FIG. 1.
Figure 2B:
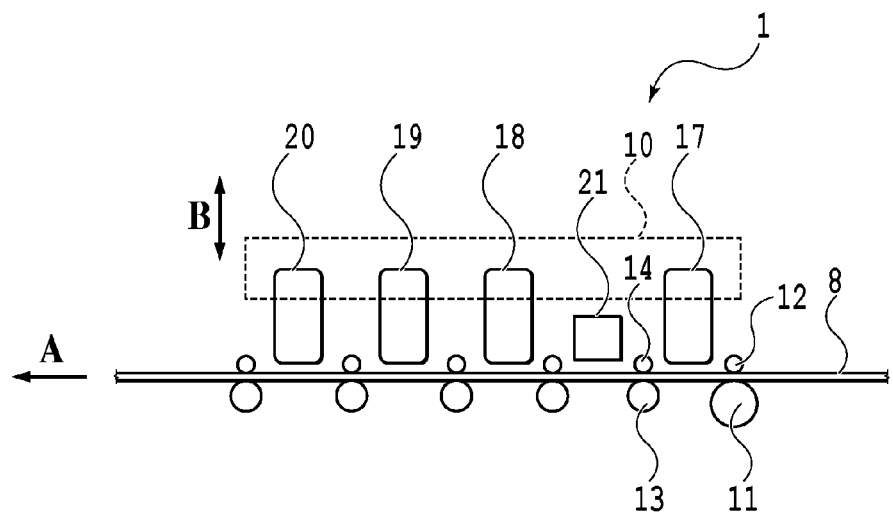

FIG. 2A and FIG. 2B are a top view and a side view, respectively, showing a detailed structure of the printing part 1 shown in FIG. 1. In these figures, the sheet 8 fed from the sheet feeding part 2 to the printing part 1 is conveyed in an arrow A direction which is the same direction as a feeding direction in the printing part 1. Along the conveying path, line-type print heads 17, 18, 19, and 20 are provided, each having nozzles for ejecting ink that are arranged in an area covering the maximum printing width of a sheet assumed to be used in a direction corresponding to the width of each conveyed sheet 8. The print heads 17, 18, 19, and 20 eject ink of yellow, black, cyan, and magenta, respectively. Further, along the sheet conveying path, a sensor unit 21 is provided downstream of the print head 17. A sheet conveying mechanism of the sheet includes a main conveying roller pair consisting of a conveying roller 11 and a pinch roller 12 that rotates following the conveying roller 11 and five sub conveying roller pairs provided downstream of the respective print heads and the sensor unit 21, each pair consisting of a conveying roller 13 and a pinch roller 14 that rotates following the conveying roller 13. Although an ejection system of each print head uses a heat generating element, other systems may also be used, such as a system using a piezoelectric element, a system using an electrostatic element, or a system using an MEMS element. Ink of each color is supplied to the corresponding print head from an ink tank via each ink tube. The number of colors and the number of print heads are not limited to four, and may be greater or less than four. Furthermore, each print head may be integrally formed with an ink tank for storing ink of the corresponding color as a unit.

Each print head is integrally held by a head holder 10. For maintenance operation, the head holder 10 may move up and down in arrow B directions by a driving mechanism (not shown).

The sensor unit 21 captures an image printed on the conveyed sheet 8. Then, information captured by the sensor unit 21 is, as described later, used in processing of detecting a movement amount or a moving speed of the sheet 8. The sensor unit 21 is located downstream of the print head 17 for yellow color and substantially in the center in the width direction of the conveyed sheet 8. For example, this allows the sensor unit 21 to be less likely to be affected by mist produced by ink ejection of the print head in marginless printing with no margin. Furthermore, a capturing result allows detection of an average amount of conveyance with respect to minor meandering or skewing of a sheet.

Figure 3A:
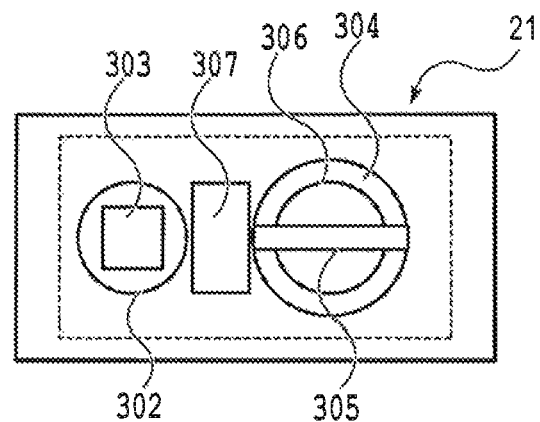
FIG. 3A and FIG. 3B are a top view and a cross-sectional side view, respectively, showing a structure of a sensor unit according to the present embodiment.
Figure 3B:
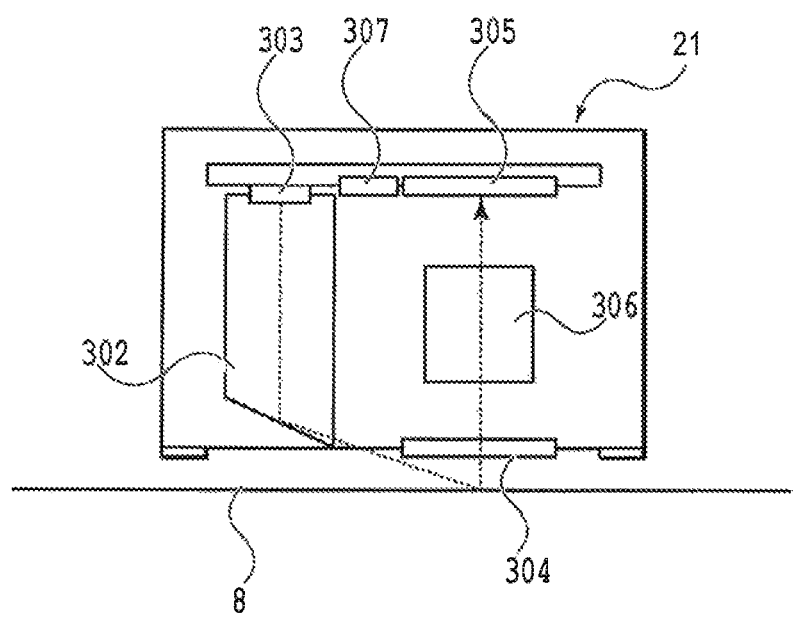

FIG. 3A and FIG. 3B are a top view and a cross-sectional side view, respectively, showing a structure of the sensor unit 21 according to the present embodiment. The sensor unit 21 generally includes a light emitting part, a light receiving part, and an image processing part. These are integrally formed as a unit. A light source 303 is a light emitting element such as an LED, an OLED, and a semiconductor laser. Light emitted from the light source 303 is guided to a surface of the sheet 8 by a light guide body 302 so that the sheet 8 is illuminated with the light in a slanting direction. An image in an illuminated area on the sheet 8 is formed in an image sensor 305 through a lens 306. A transparent protection cover 304 prevents ink mist or the like from entering from the sheet 8 and protects the lens 306 from dirt. More specifically, the image sensor 305 may include a plurality of line image sensors having a plurality of photoelectric transducers of a CCD or CMOS structure arranged one-dimensionally, or may be an area image sensor having a plurality of photoelectric transducers of a CCD or CMOS structure arranged two-dimensionally. That is, the image sensor 305 is an image sensor that can image a detection pattern at a time in a two-dimensional area having a certain size.

Figure 4:
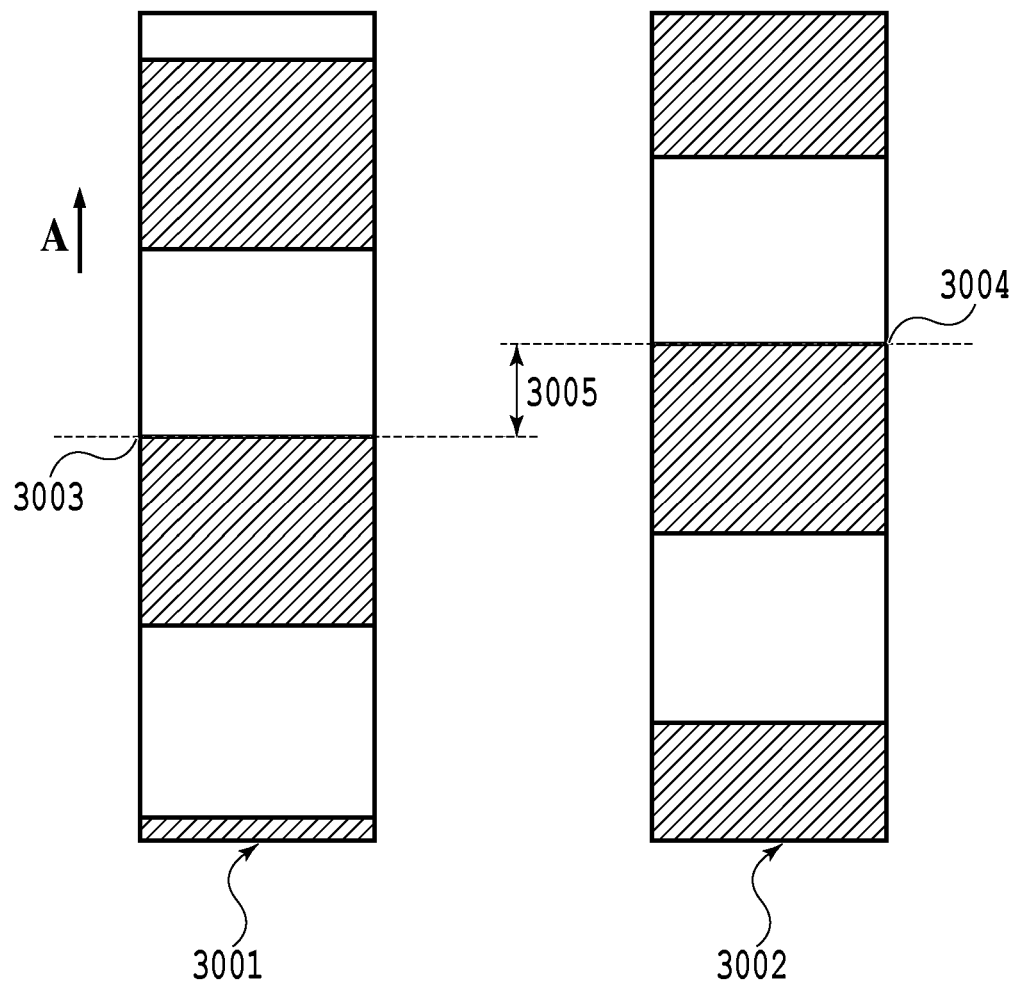
FIG. 4 is a view illustrating the principle of detection of a detection pattern by an image sensor according to one embodiment.

FIG. 4 is a view illustrating the principle of detection of a detection pattern by the image sensor 305 according to the present embodiment. More specifically, FIG. 4 shows images captured at different timings by the fixed image sensor 305 relative to a moving sheet. Each captured image shows a partial area of the surface of the sheet. The sheet is conveyed in the arrow A direction in the figure. An image 3001 is an image first captured, and an image 3002 is an image captured after the sheet has moved for a predetermined time from the time the image 3001 was captured. In the detection pattern of the present embodiment, as its details will be described later, two types of patterns formed by digital watermarking are alternately arranged. The captured images include arrays of these alternate patterns. Then, in detecting a detection pattern in these captured images, a search is made for where in the captured image 3002 acquired after a predetermined time associated with the above-mentioned different timing exists a position 3003 of a boundary between a pair of patterns in the captured image 3001. As a result, it is detected that the boundary exists in a position 3004 shown by a broken line in the captured image 3002. In this search, based on, for example, a possible maximum change in a conveyance amount that may be produced in the apparatus and a conveyance speed of a sheet, it is determined how much the boundary position changes in the predetermined time, and the boundary within a range of the position change is identified as a corresponding boundary in the captured image 3002 acquired after the predetermined time.

Next, it is detected, in the captured images, by how many pixels, the boundaries identified as the same boundary between the two captured images are separated in a conveying direction, and the resultant is obtained as a movement amount 3005 of the sheet in the above-mentioned predetermined time. Here, coordinates for measuring the number of pixels between the boundaries with respect to the movement amount are fixed to the image sensor 305. More specifically, the above-mentioned movement amount is obtained based on the number of captured pixels according to a resolution of the image sensor 305. It should be noted that coordinates for obtaining a movement amount is not limited to this. Any coordinates may be used as long as the coordinates are fixed apart from the conveyed sheet.

Further, a difference between the movement amount 3005 thus obtained and a movement amount set in advance as a reference is obtained, and this is obtained as a change in an amount of conveyance in the above-mentioned predetermined time. More specifically, after the captured image 3001 is acquired at a timing t1, the captured image 3002 is acquired at a timing t2 after a predetermined time T1 has passed. Then, by searching the same boundary between the two captured images, a movement amount between the two boundary positions is obtained. For example, if the movement amount 3005 corresponding to the above-obtained pixels after conversion is 810 μm and a movement amount as a predetermined reference after conversion is 800 μm, a difference of +10 μm is a change in the amount of conveyance in the predetermined time T1. A change of +10 μm in the predetermined time T1 means that the conveyance speed has increased. On the other hand, if a change is a negative value "−," it means that a conveyance speed has decreased. The changes in speed thus obtained are, as will be described later, sent to the following print control as feedbacks. Based on the feedbacks, an ejection timing is adjusted. Details of the print control will also be described later.

Figure 5:
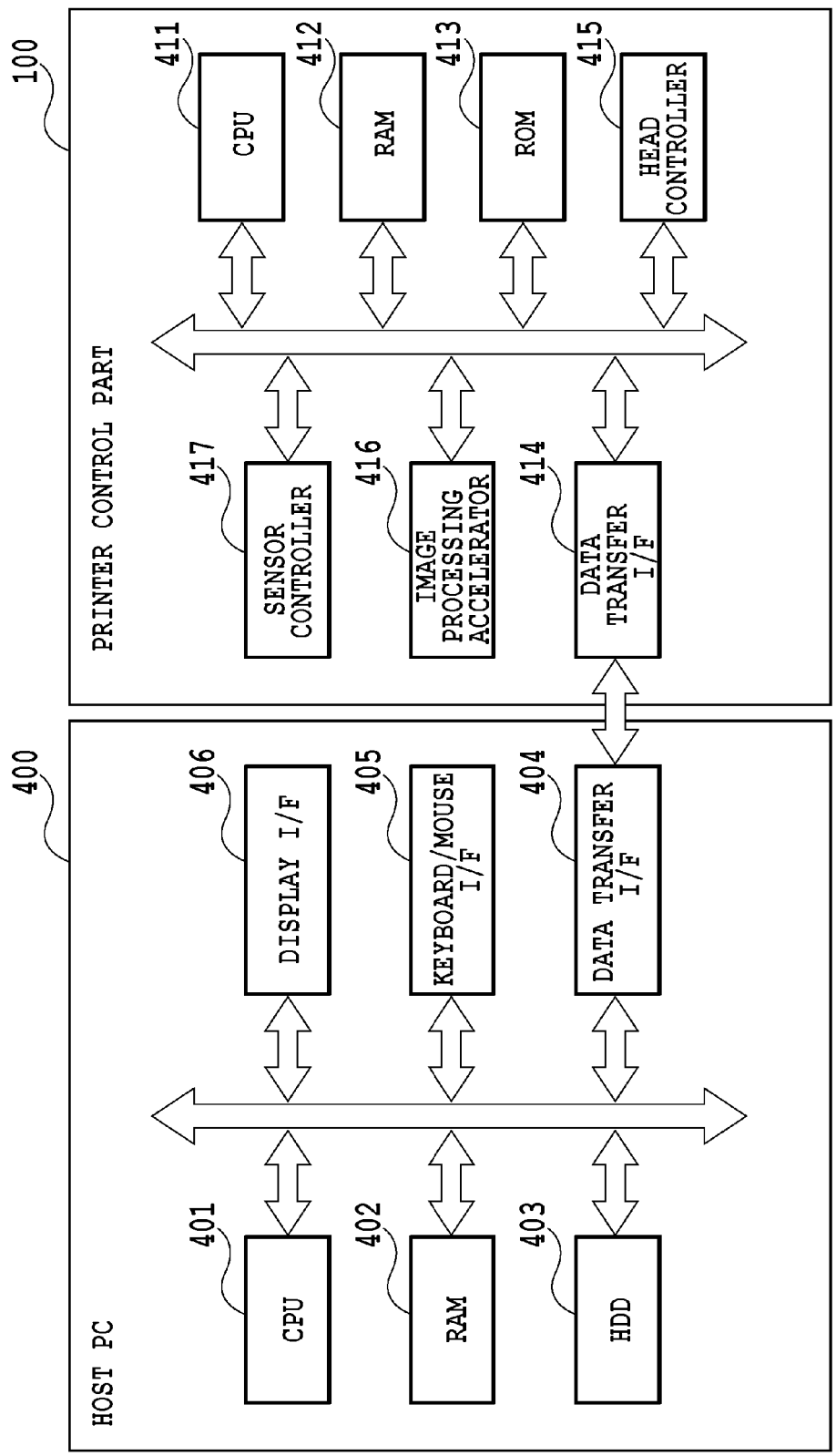
FIG. 5 is a block diagram showing a structure of a printing system according to one embodiment of the present invention.

FIG. 5 is a block diagram showing a structure of a printing system according to one embodiment of the present invention. As shown in FIG. 5, the printing system includes a control part 100 of a printer 1 shown in FIG. 1 and a control part of a personal computer (PC) 400 as a host device.

The PC 400 mainly includes the following elements. A CPU 401 executes processing according to programs retained in a HDD 403 and a RAM 402. The RAM 402 is a volatile storage and temporarily retains programs and data. The HDD 403 is a non-volatile storage and similarly retains programs and data. A data transfer I/F (interface) 404 controls transmission and reception of data between the PC 400 and the control part 100. For a connection system of the data transmission and reception, a USB, an IEEE 1394, a LAN, and the like may be used. A keyboard/mouse I/F 405 is an interface for controlling a human interface device (HID) such as a keyboard and a mouse. A user can input data through the keyboard/mouse I/F 405. A display I/F 406 controls displays on a display (not shown).

Meanwhile, the control part 100 mainly includes the following elements. A CPU 411 executes processing of each embodiment (described later) according to programs retained in a ROM 413 and a RAM 412. The RAM 412 is a volatile storage and temporarily retains programs and data. The ROM 413 is a non-volatile storage and retains various kinds of table data and programs. A data transfer I/F 414 controls transmission and reception of data between the PC 400 and the control part 100. A head controller 415 provides print data to print heads 101 to 104 shown in FIG. 1 and controls ejection operations of the print heads. More specifically, the head controller 415 can read a control parameter and print data from a predetermined address in the RAM 412. If the CPU 411 writes a control parameter and print data to the predetermined address of the RAM 412, the head controller 415 starts processing, and ink ejection is performed from the print head. An image processing accelerator 416 includes hardware to execute image processing at a speed higher than that of the CPU 411. More specifically, the image processing accelerator 416 can read a parameter and data needed for the image processing from a predetermined address of the RAM 412. If the CPU 411 writes the parameter and data to the predetermined address of the RAM 412, the image processing accelerator 416 is activated, and predetermined image processing is performed.

A sensor controller 417 controls the sensor unit 21 shown in FIG. 3A and FIG. 3B to acquire a signal of the image captured by the image sensor 305. Based on the signal, the CPU 411 performs control to execute image analysis processing, and movement information (a movement amount, a moving speed, a moving acceleration, a moving direction, or the like) on a conveyed sheet is detected. Processing requiring speedup partially in the analysis processing is transmitted to the image processing accelerator 416, and computing processing is executed. The movement information on the detected sheet is transmitted to the head controller 415, and an ink ejection timing is controlled according to an amount of conveyance of the sheet 8. More specifically, if it is determined that a conveyance speed is lower than a predetermined speed, an ejection timing is delayed. If it is determined that a conveyance speed is higher than a predetermined speed, an ejection timing is advanced, so that a relative positional relationship between a sheet and a print position is controlled to remain the same.

According to one embodiment of the present invention, an invisible mark, so-called digital watermark information, is added to a printed material, and position information on the digital watermark is decoded from image information read by the image sensor of the sensor unit 21. Based on the position information, movement information on the sheet is obtained. As used herein, the term "digital watermarking" or "digital watermark" is a generic term of the technique of changing print image information or a printing process and embedding information into an image to be printed. Except for the image information and printing process, it does not include a technique of physically or chemically changing a medium to embed information into the medium.

Next, a description will be given of a process in which a digital watermark is added and printed according to one embodiment of the present invention.

Figure 6:
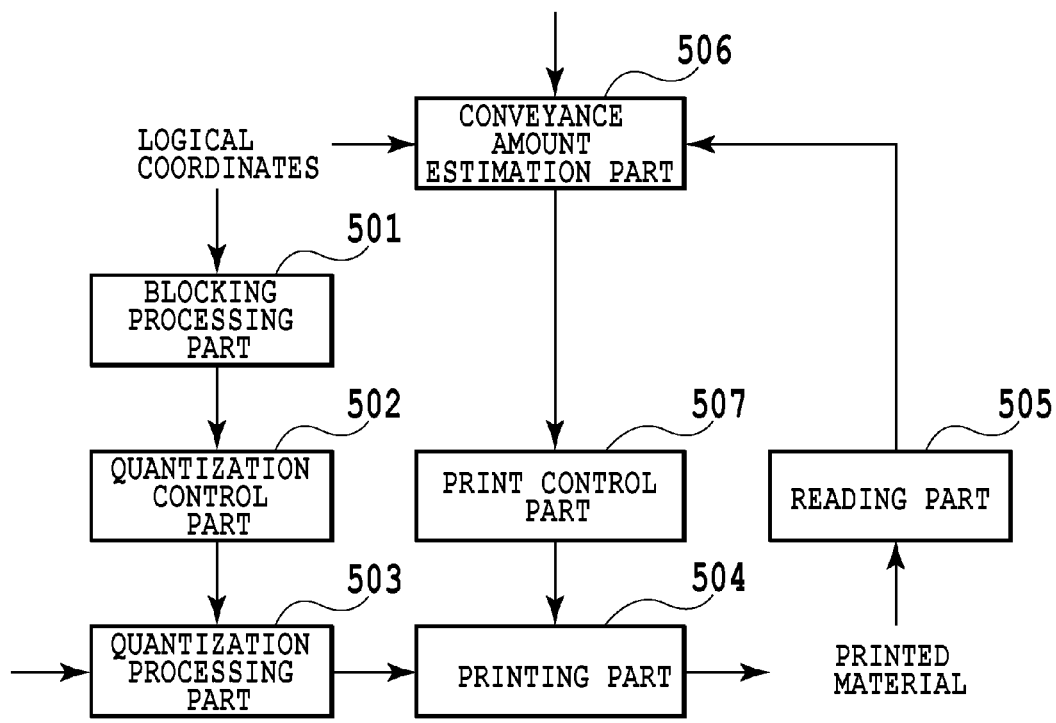
FIG. 6 is a block diagram showing a structure for sending a feedback to print control by printing with a digital watermark added and analyzing information obtained by reading a result of the printing according to one embodiment of the present invention.

FIG. 6 is a block diagram showing a configuration for printing with adding of a digital watermark and for analyzing information obtained by reading a result of the printing to provide a feedback to print control, according to one embodiment of the present invention. The present processing is mainly executed by the control part 100 of the printing system shown in FIG. 5. It should be noted that in the present embodiment, a digital watermark is added to image information on yellow ink. Accordingly, estimation of the conveyance amount, which will be described later, is based on printing with the yellow ink and a result of reading the printing.

In FIG. 6, a blocking processing part 501 performs blocking of a unit including a predetermined number of pixels based on logical coordinates of pixels in image data inputted. The block may be a rectangular area, or an area in another shape. The logical coordinates are logically specified as a print position of image information with respect to a sheet. Mechanical, electrical, physical, and chemical variations produced in the printing process, such as expansion and contraction of a sheet or a change in the conveyance amount, are not taken into consideration for the logical coordinates. A quantization control part 502 controls conditions of quantization performed in a quantization processing part 503 for each blocked unit including a predetermined number of pixels. The quantization processing part 503 uses error diffusion to quantize inputted multivalued image data and generates print data having levels less than gradation levels of the inputted image.

Figure 7:
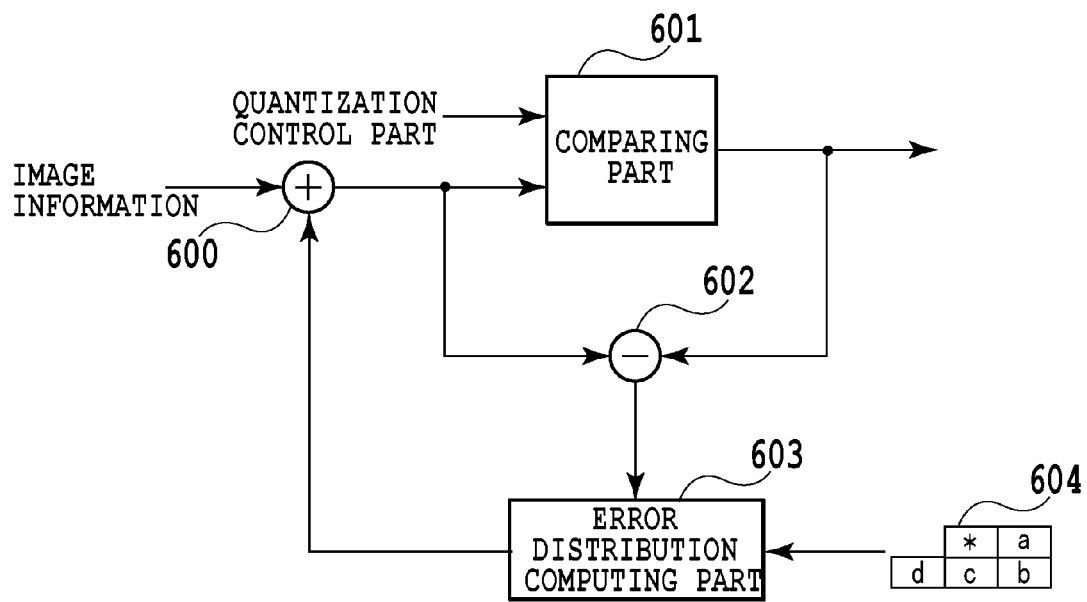
FIG. 7 is a block diagram showing details of a quantization processing part of FIG. 6.

FIG. 7 is a block diagram showing details of the quantization processing part 503 shown in FIG. 6 and shows the configuration of error diffusion processing. Details of the error diffusion processing are disclosed, for example, in the following literature: R. Floyd & L. Steinberg, "An Adaptive Algorithm for Spatial Grayscale," SID Symposium Digest of Paper, pp. 36-37 (1975).

In the present embodiment, error diffusion processing with quantization levels being binary is performed. In FIG. 7, an adder 600 adds, to a value of an object pixel (image information) on which error diffusion processing is to be performed in the inputted image data, a quantization error from an error distribution computing part 603, which is distributed from adjacent pixels that have already been binarized. Then, a comparing part 601 compares a threshold specified by the quantization control part 502 (FIG. 6) with a result of addition obtained by adding the error. If the result is greater than the threshold, "1" is outputted, and if not, "0" is outputted. For example, in the case of 8-bit image data, the value added is between a maximum value of "255" and a minimum value of "0." This is compared with the threshold. If a quantization value is "1," an ink dot is printed on the pixel.

A subtracter 602 calculates an error between the result of quantization and the above-described result of addition and sends the error to the error distribution computing part 603 as an error of the object pixel. Then, the error distribution computing part 603 distributes the error to adjacent pixels on which quantization processing will be performed according to a distribution table 604. The distribution table 604 specifies a distribution ratio of errors for each pixel. The distribution ratio is experimentally set based on a relative distance between the object pixel and adjacent pixels. It should be noted that although the distribution table 604 shows a distribution table including adjacent four pixels, the distribution table is not limited to this.

Figure 8:
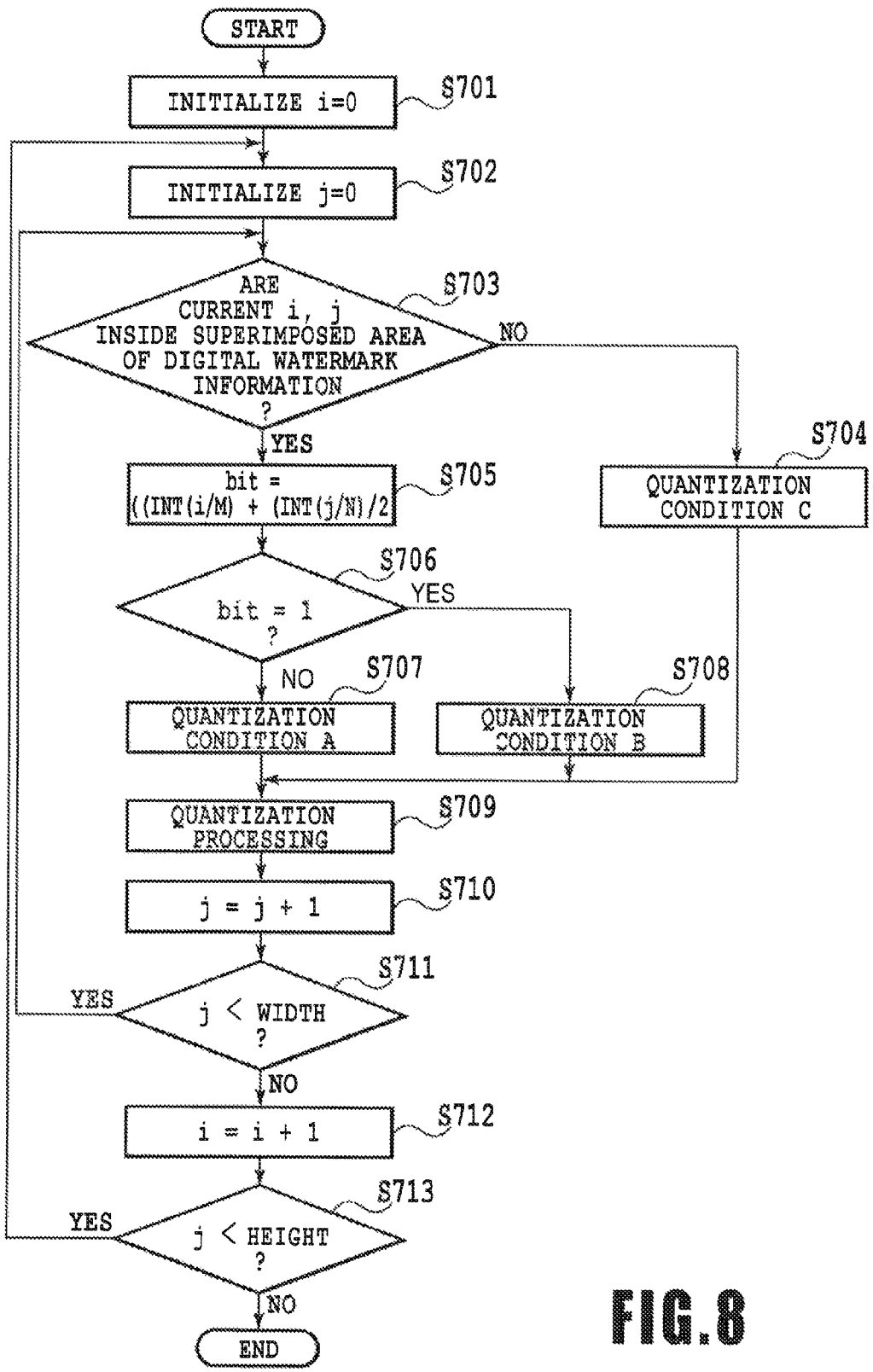
FIG. 8 is a flow chart showing a procedure of printing processing including processing by the quantization processing part according to a first embodiment of the present invention.

FIG. 8 is a flow chart showing a procedure of printing processing including processing by the quantization control part 502 according to the present embodiment. First, in step S701, a variable i is initialized. The variable i is a variable used for incrementing an address of a pixel in a vertical direction in image data. In step S702, a variable j is initialized. The variable j is a variable used for incrementing an address of a pixel in a horizontal direction in image data. Next, in step S703, it is determined whether a pixel to be processed, shown by the coordinates of the variables i and j, belongs to an area on which superimposition of digital watermark information should be performed. As used herein, the term "superimposition" of digital watermark information does not necessarily mean overlaying information different from an image to be printed on the image to be printed. Examples of the digital watermark information include also a predetermined pattern if an image to be printed itself is changed so that a predetermined pattern is detected. In this sense, the term "superimposition" of digital watermark information may also include addition of digital watermark information.

Figure 9:
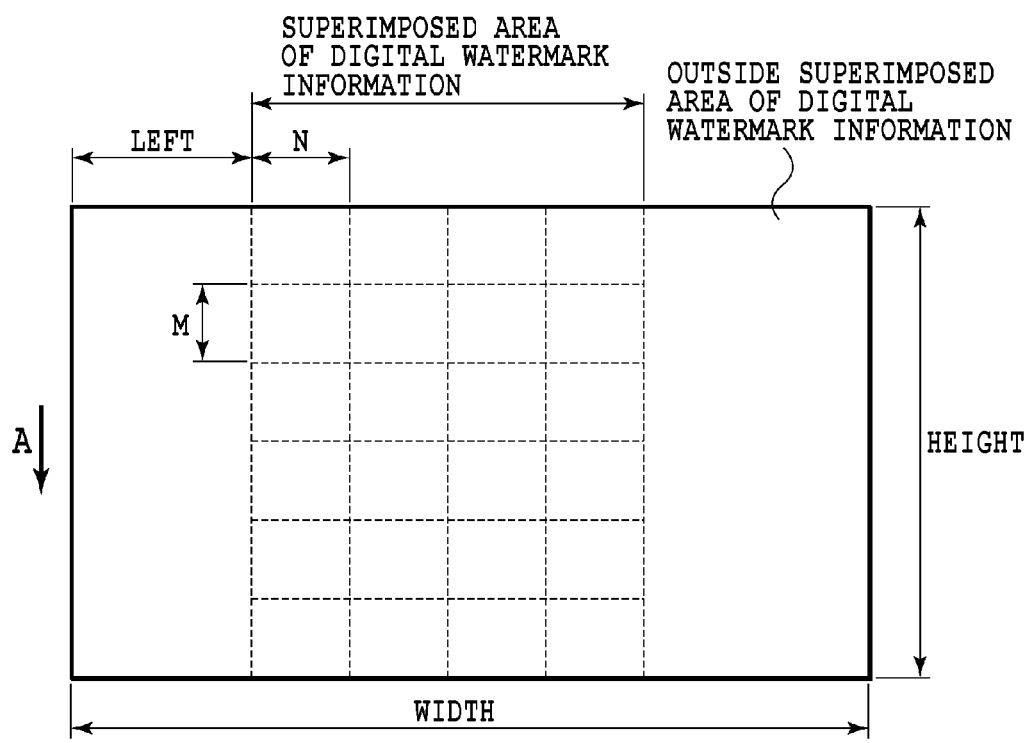
FIG. 9 is a view illustrating a superimposed area of digital watermark information in area determination shown in FIG. 8.

FIG. 9 is a view illustrating a superimposed area of digital watermark information in the above determination. As shown in FIG. 9, in the present embodiment, the superimposed area of digital watermark information is defined in an area of image data consisting of WIDTH pixels in a horizontal direction and HEIGHT pixels in a vertical direction. If the image data in this area is printed over the entire sheet, in the printing apparatus of the present embodiment shown in FIG. 2A and FIG. 2B, since the sensor unit 21 is positioned substantially in the center in the width direction of the sheet, a center part of a portion corresponding to the sheet width of the area is a superimposed area of digital watermark information. Then, if the logical horizontal coordinate in the left end of the superimposed area of digital watermark information is set to LEFT, blocking is performed based on the coordinate LEFT (the blocking processing part 501 of FIG. 6). More specifically, as each block is shown by broken lines, the superimposed area is divided based on the coordinate LEFT to define a plurality of blocks, each having N pixels in width and M pixels in height. It should be noted that the coordinate value LEFT is preferably an integral multiple of N.

Referring back to FIG. 8, in step S703, if it is determined that the object pixel is outside the superimposed area of digital watermark information (an area outside the blocks shown by the broken lines in FIG. 9), a quantization condition C is set in step S704. On the other hand, if it is determined that the object pixel is inside the superimposed area of digital watermark information (an area inside the blocks shown by the broken lines in FIG. 9), in step S705, a variable for specifying digital watermark information to be superimposed is obtained. A variable bit is calculated by the following Formula 1:

$$\text{bit} = \text{MOD}((\text{INT}(i/M) + \text{INT}(j/N)), 2) \quad \text{(Formula 1)}$$

wherein INT( ) represents an integer portion in ( ), and MOD(A, B) represents a remainder when A is divided by B.

In this manner, the variable bit represents a remainder when the integer is divided by 2, and a value of the variable bit is either "0" or "1." In step S706, it is determined whether the variable bit is "1" or "0." If the variable bit is determined to be "0," a quantization condition A is set in step S707. If the variable bit is determined to be "1," a quantization condition B is set in step S708.

As described above, in the present embodiment, as the details will be described later, different quantization conditions are set depending on the blocks inside the superimposed area of digital watermark information, whereby different digital watermark information is superimposed on different blocks. Then, based on the detected digital watermark information, a boundary between blocks is detected.

Next, in step S709, based on the quantization condition as a set printing condition, quantization processing is performed. The quantization processing is performed by error diffusion as already described with reference to FIG. 7. Then, in step S710, the variable j in the horizontal direction is incremented and in step S711, it is determined whether the value incremented is less than WIDTH, that is, the number of horizontal pixels of the image data. The above-described processing is repeated until the number of processed pixels reaches WIDTH. If processing in the horizontal direction is completed with respect to the WIDTH pixels, in step S712, the variable i in the vertical direction is incremented and in step S713, it is determined whether the value incremented is less than HEIGHT, that is, the number of vertical pixels of the image data. The above-described processing is repeated until the number of processed pixels reaches HEIGHT.

The above processing procedure can change the quantization condition for each block consisting of N pixels×M pixels in the superimposed area of digital watermark information. More specifically, by calculating the variable bit according to Formula 1, digital watermark information by a quantization condition A and digital watermark information by a quantization condition B can be staggered for each block shown by the broken lines in the superimposed area of digital watermark information shown in FIG. 9.

Next, a description will be given of specific examples of the above-described quantization conditions A and B associated with digital watermark information and the quantization condition C applied to image data to be printed on which digital watermark information will not be superimposed.

In one embodiment of the present invention, a quantization condition is set as a quantization threshold in error diffusion. Since the quantization condition C is applied to image data outside the superimposed area of digital watermark information, any quantization threshold used for normal printing may be used. As described above, if one pixel is expressed by 8-bit gradation and quantization levels are binary, a quantization representing value is a maximum value of "255" and a minimum value of "0", and an intermediate value of "128" between them is often set as a quantization threshold. That is, the quantization condition C is a condition in which a quantization threshold is set to a fixed value of "128" in the present embodiment.

The quantization conditions A and B are applied to image data inside the superimposed area of digital watermark information, and cause a difference in image quality due to different quantization conditions. Here, it is preferable that the difference in image quality be expressed in a manner that it is difficult to be visually recognized, and be easily detected from a sheet.

FIG. 10A and FIG. 10B are views illustrating the quantization conditions A and B according to the present embodiment, respectively. FIG. 10A shows a pattern of thresholds with the quantization condition A. In FIG. 10A, one square shows one pixel. A blank square shows a pixel having a fixed threshold, which is the same value as the one with the quantization condition C, and a gray square shows a pixel having a threshold relatively greatly different from the above-mentioned fixed threshold. With the quantization condition A as shown in FIG. 10A, a pixel matrix of a unit consisting of 8 pixels in width and 4 pixels in height is defined, and a threshold of a gray square is set to a threshold greatly different from a fixed threshold. With the quantization condition B as shown in FIG. 10B, a matrix of a unit consisting of 4 pixels in width and 8 pixels in height is defined, which is different from the threshold pattern of FIG. 10A. A blank square shows a pixel of a fixed threshold, which is the same value as the one with the quantization condition C, and a gray square shows a pixel having a threshold relatively greatly different from the above-mentioned fixed threshold. The values of "thresholds relatively greatly different" may be set in consideration of an influence of digital watermark information produced by the values on a printed image or the accuracy in decoding digital watermark information based on a result of reading the printed image on which digital watermark information is superimposed.

In the present embodiment, a fixed threshold is "128" as described above as to the quantization condition C. on the other hand, a greatly different threshold of a pixel shown by a gray square is "10". By setting a small threshold in this manner, it becomes easy to set "1" (a quantization representing value of "255") to a quantization value of an object pixel. That is, on both of the quantization conditions shown in FIG. 10A and FIG. 10B, it becomes easy to arrange a quantization value of "1" in the arrangement of gray squares in each of FIG. 10A and FIG. 10B. In other words, in an arrangement of blocks each of which is consisting of N pixels×M pixels, either a block producing dots in the arrangement of gray squares shown in FIG. 10A and a block producing dots in the arrangement of gray squares shown in FIG. 10B alternately appears. In this manner, print data of the yellow ink can be acquired through the quantization processing (acquisition of print data).

It should be noted that few changes in the above-described quantization thresholds in error diffusion do not have much influence on image quality. In an ordered dither method, image quality in gradation expression greatly depends on a dither pattern to be used. However, the error diffusion which regularly gives changes in quantization thresholds as described above produces few changes in the order of dots or only a minor change such as a change in generation of texture, and does not so much affect image quality in gradation expression. This is because even if a quantization threshold changes, an error that forms a difference between a signal value and a quantization value is diffused to adjacent pixels, and accordingly inputted signal values are stored in a macro manner. That is, redundancy is large with respect to the arrangement of dots and generation of texture in error diffusion.

Referring back to FIG. 6, a printing part 504 ejects yellow ink to the sheet 8 to print an image based on print data of the yellow ink generated through the above-described quantization processing. The result of the printing with yellow ink includes digital watermark information. A reading part 505 reads the image which is printed on the sheet 8 and to which digital watermark information is added. Then, a conveyance amount estimation part 506 decodes a superimposed digital watermark based on the read information to recognize a boundary between blocks, and by detecting movement of the boundary as described above with reference to FIG. 4, an amount related to conveyance of a sheet such as a change in conveyance speed is estimated (acquisition of conveyance information).

Figure 11:
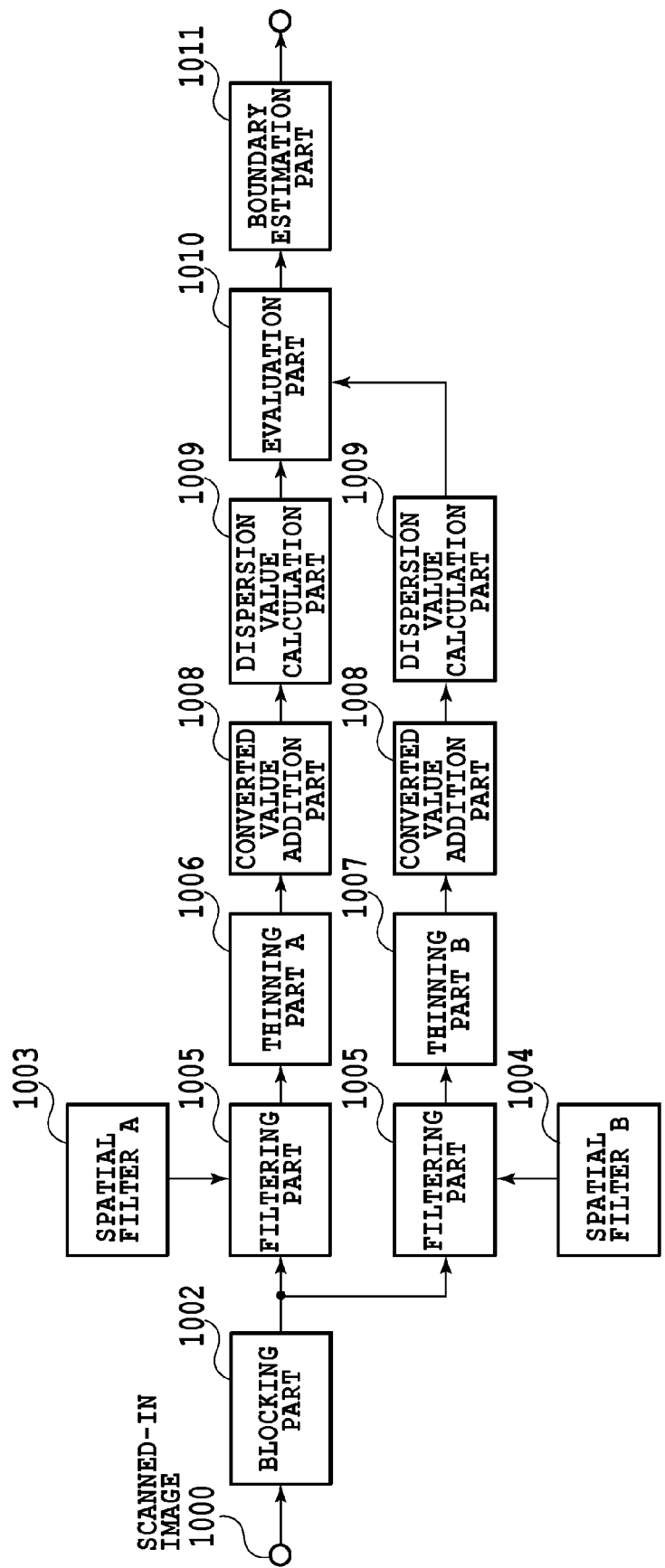
FIG. 11 is a block diagram showing a detailed structure of a conveyance amount estimation part according to the present embodiment shown in FIG. 6.

FIG. 11 is a block diagram showing a detailed processing configuration of the conveyance amount estimation part 506 according to the present embodiment shown in FIG. 6. In FIG. 11, an input terminal 1000 is a terminal which receives image information read by the image sensor 305 (FIG. 3A and FIG. 3B) of the sensor unit 21. A reading resolution of the image sensor 305 is preferably equal to or greater than a resolution used when printing is performed on a sheet. In the present embodiment, a printing resolution and a reading resolution of the image sensor are the same resolution.

In a blocking part 1002, blocking of a unit consisting of P pixels in width and Q pixels in height is performed. This block is a unit on which processing of decoding digital watermark information from the read image is performed. In the present embodiment, while digital watermark information is decoded, a boundary between blocks on which digital watermark information is superimposed, corresponding to the two quantization conditions A and B as described above with reference to FIG. 10A and FIG. 10B, is obtained. Accordingly, the block consisting of P pixels in width and Q pixels in height is smaller in size than the block consisting of N pixels×M pixels, on which superimposition processing of a digital watermark is performed. That is, the following relation is satisfied:

$$P \leq N \text{ and } Q \leq M \quad \text{(Formula 2).}$$

Figure 12:
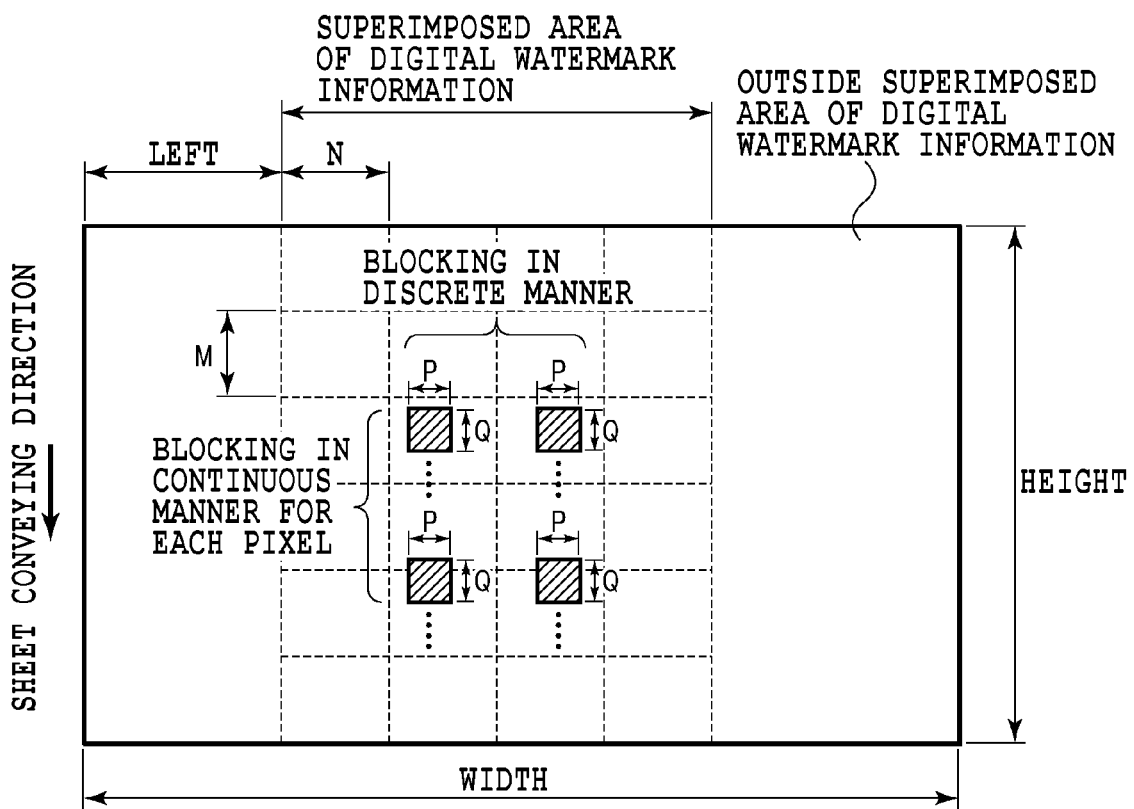
FIG. 12 is a view illustrating blocking processing shown in FIG. 11.

FIG. 12 is a view illustrating processing by the blocking part 1002 shown in FIG. 11. As shown in FIG. 12, in an area corresponding to the superimposed area of digital watermark information, the blocks (shown by the diagonally shaded areas in FIG. 12), each consisting of P pixels×Q pixels, result from blocking in a discrete manner by a predetermined number of pixels in the width direction of the sheet, whereas in a sheet conveying direction, result from blocking as an object pixel to be processed changes, that is, along with movement by one pixel.

Referring back to FIG. 11, a filtering part 1005 performs filtering on a blocked read image as to an object pixel for each block. The filtering is performed by using two types of filters corresponding to the quantization conditions A and B in the superimposition of digital watermark information, that is, a spatial filter A 1003 and a spatial filter B 1004.

FIG. 13A and FIG. 13B are views showing an example of the spatial filter A 1003 and an example of the spatial filter B 1004 according to the present embodiment, respectively. Filter coefficients and their arrangement in these spatial filters correspond to periods of thresholds with the quantization conditions in the superimposition of digital watermark information shown in FIG. 10A and FIG. 10B. In FIG. 13A and FIG. 13B, a center part of 5 pixels×5 pixels is an object pixel, and 24 pixels other than the object pixel are adjacent pixels. In FIG. 13A and FIG. 13B, a pixel in a blank portion indicates that the filter coefficient is "0". As is apparent from the figures, FIG. 13A and FIG. 13B show filters for edge enhancement. The orientation of the edge to be enhanced matches with the orientation of the thresholds in the superimposition of digital watermark information. That is, the filter A shown in FIG. 13A and the filter B shown in FIG. 13B are generated in a manner corresponding to the quantization condition A shown in FIG. 10A and the quantization condition B shown in FIG. 10B, respectively.

Next, a thinning part A 1006 and a thinning part B 1007 perform thinning processing based on predetermined rules on signals (hereinafter referred to as a converted value) after filtering in the block consisting of P pixels×Q pixels. In the present embodiment, the rules of the thinning are separated into periods and phases. That is, as will be described later with reference to FIG. 16 and FIG. 17, the thinning part A 1006 and the thinning part B 1007 have different thinning periods, and individually perform thinning processing multiple times for respective phases. A converted value addition part 1008 adds a converted value obtained by thinning by the thinning part A 1006 and a converted value obtained the thinning part B 1007 for each phase. This thinning processing and addition processing of the converted value correspond to extraction of a power spectrum of a predetermined frequency vector enhanced by the spatial filter. A dispersion value calculation part 1009 calculates a dispersion value of a plurality of addition values obtained by addition for each phase with respect to each period.

An evaluation part 1010 determines the likelihood of a code superimposed as digital watermark information based on the dispersion value in each period calculated in the above. Then, a boundary estimation part 1011 estimates a switching position of the code superimposed based on a plurality of evaluation results by the evaluation part 1010, so that a boundary between blocks on which digital watermark information is superimposed is estimated. In print control, as will be described later, by obtaining a movement amount of the estimated boundary in a predetermined time, a change in conveyance speed can be detected.

Figure 14:
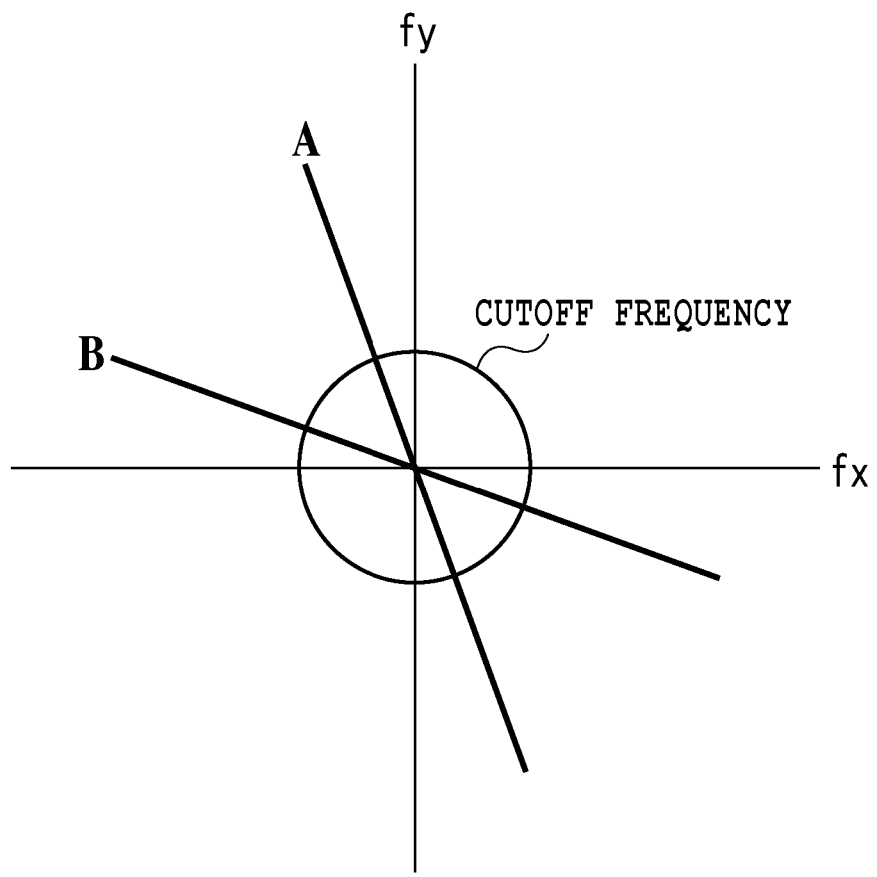
FIG. 14 is a view showing frequency vectors corresponding to quantization conditions when superimposing digital watermark information in a two-dimensional frequency area according to the present embodiment.

FIG. 14 is a view showing frequency vectors corresponding to quantization conditions when superimposing digital watermark information in a two-dimensional frequency area according to the present embodiment. In FIG. 14, a lateral axis shows a frequency in a horizontal direction and a longitudinal axis shows a frequency in a vertical direction. A point of origin as the center shows a component of direct current. As a distance from the point of origin increases, a frequency becomes higher. A circle in FIG. 14 shows a cutoff frequency after error diffusion processing. Filter characteristics by the error diffusion processing show characteristics of a high-pass filter (HPF) in which a low-frequency area is cut off. The cutoff frequency varies depending on the density of a target image. As in the present embodiment, changing a threshold of quantization changes frequency characteristics of data after quantization. More specifically, with the thresholds shown in FIG. 10A, a large power spectrum is produced on a frequency vector A shown in FIG. 14, and with the thresholds shown in FIG. 10B, a large power spectrum is produced on a frequency vector B shown in FIG. 14.

In the processing of detecting digital watermark information from a read image, a frequency vector which produces a relatively large power spectrum as described above is detected, so that a signal on which digital watermark information is superimposed can be determined. The filters shown in FIG. 13A and FIG. 13B correspond to HPFs having orientation of specific frequency vectors. More specifically, the spatial filter of FIG. 13A can enhance the frequency vector on a straight line A shown in FIG. 14, and similarly the spatial filter of FIG. 13B can enhance the frequency vector on a straight line B shown in FIG. 14. For example, in the present example in which a large power spectrum is produced on the frequency vector on the straight line A shown in FIG. 14 with the quantization condition shown in FIG. 10A, the spatial filter of FIG. 13A amplifies a change in the power spectrum, whereas the spatial filter of FIG. 13B hardly amplifies a change in the power spectrum. More specifically, if parallel filtering is performed by using a plurality of spatial filters, only a spatial filter having the corresponding frequency vector amplifies a change, whereas other spatial filters hardly amplify a change. Therefore, it is easy to know on which frequency vector a large power spectrum is produced.

Figure 15:
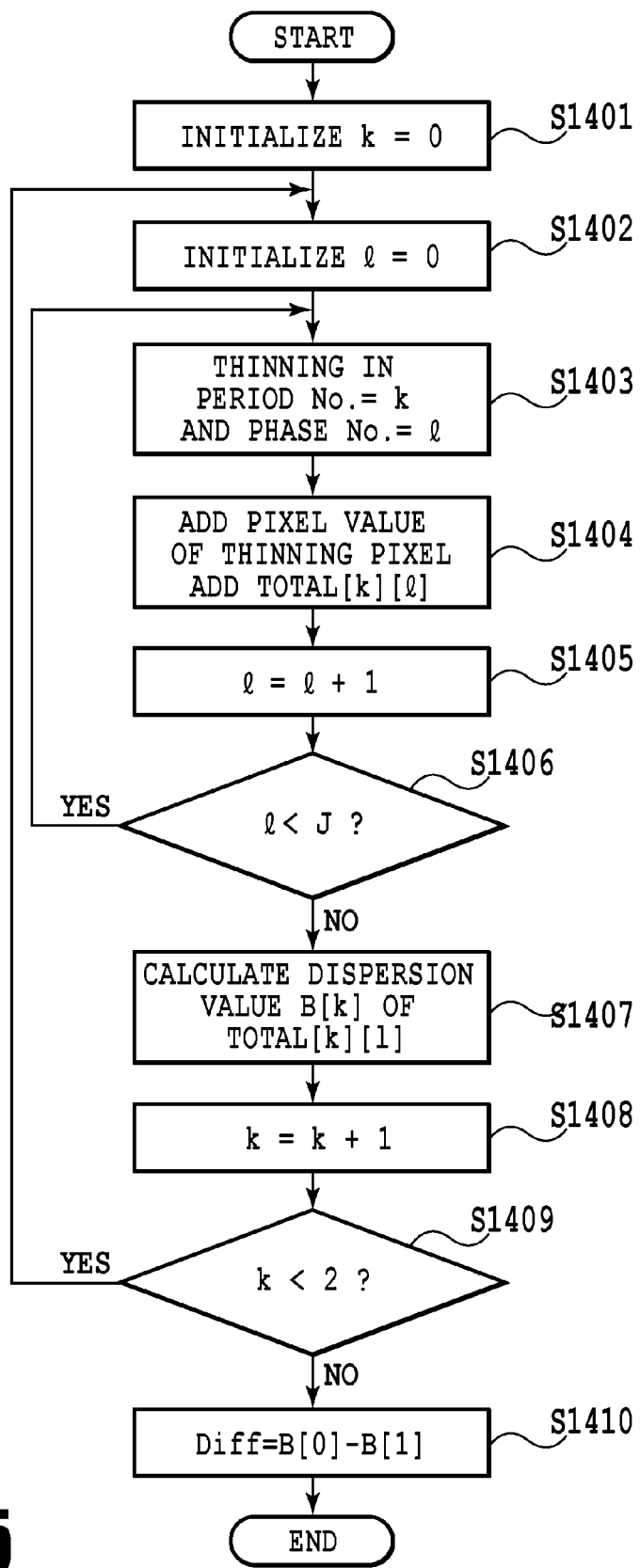
FIG. 15 is a flow chart showing a processing procedure in a thinning part, a converted value addition part, a dispersion value calculation part, and an evaluation part shown in FIG. 11.

FIG. 15 is a flow chart showing a processing procedure in the thinning parts 1006 and 1007, the converted value addition part 1008, the dispersion value calculation part 1009, and the evaluation part 1010 described above.

First, in step S1401 and step S1402, variables are initialized. More specifically, values of variables k and l related to the above-described thinning processing or the like are initialized to zero. Next, in step S1403, the thinning parts 1006 and 1007 perform thinning processing on converted values obtained after filtering of a block corresponding to an object pixel according to the above variables. In the present processing, with respect to the converted value for each pixel in the block, a variable related to a period is set as k and a variable related to a phase is set as l. It should be noted that the period corresponds to a quantization condition when superimposing digital watermark information, and in the present embodiment, may take on two values, that is, k=0 or k=1, corresponding to two types of quantization conditions A and B. The conditions of periods and phases are controlled by numbers. In the present processing, as the details will be described later with reference to FIG. 16 and FIG. 17, thinning is performed according to each variable when a period number (hereinafter abbreviated as No.) is k and a phase No. is l.

Next, in step S1404, the converted value addition part 1008 adds to the period k the converted value extracted according to the phase l. For example, if the period No. is k=0, extraction is performed on the converted value corresponding to the phase l with respect to the converted value as a result of filtering by the filtering part 1005. Then, the addition value, that is, the addition result, is stored as TOTAL[k][l]. In step S1405, the variable l is incremented and in step S1406, the resultant is compared with a fixed value J. J represents the number of thinning with different phases. Here, if the variable l is less than J, the process returns to step S1403, and the thinning processing and the addition processing on the converted value after thinning are repeated according to another phase No. by l after incrementing.

If the set number of times (J times) of the thinning processing and the addition processing for each different phase are completed, in step S1407, the dispersion value calculation part 1009 obtains an average of the addition results for addition result TOTAL[k][l], obtains a difference between the average and each sample, and calculates a dispersion value by obtaining a sum of squared differences. That is, a value representing variations in the addition result for each phase depending on the difference in the phase is obtained. More specifically, with respect to one period k, J dispersion values of TOTAL[k][l] are obtained. The dispersion value with respect to the obtained period k is set as B[k]. In step S1408, the variable k is incremented and in step S1409, it is determined whether k is less than 2. If the variable k is less than 2, the process returns to step S1402, and by using a new condition of the period No. by k after incrementing, the thinning processing and the addition processing on the converted value are repeated. If k is determined to be 2 in step S1409, it means that dispersion values B[0] and B[1] are calculated as two dispersion values B[k]. Then, in step S1410, the evaluation part 1010 calculates a difference between the two dispersion values B[0] and B[1] as a variable Diff.

After the above variable Diff is obtained with respect to one block, an object pixel is shifted by one pixel in a direction in which the sheet is conveyed for blocking, and in the same manner as the processing procedure shown in FIG. 15, the processing is performed on the block.

A description will be given of a specific example of the above-described processing in a case where the number of times J for different phases is J=4. FIG. 16 and FIG. 17 are tables showing thinning in a case where the size of a block is P=Q=16. In these figures, one square in the block shows one pixel. FIG. 16 shows thinning processing (processing by the thinning part A 1006 of FIG. 11) in a case where the period No. is 0, that is, k=0. FIG. 17 shows thinning processing (processing by the thinning part B 1007 of FIG. 11) in a case where the period No. is 1, that is, k=1. In these figures, a value shown in each pixel in the block represents l, which is a phase No., and represents a pixel to be thinned corresponding to the phase shown by l. For example, the pixel representing "0" will be an extracted pixel if l=0. That is, in FIG. 16 and FIG. 17, there are four types of phases, and different extractions are performed corresponding to a phase No. l in a range of 0 to 3. It should be noted that in the example shown in the figures, the shape of the block is a square of P=Q. However, the shape of the block is not limited to the square, and may include a rectangle or other than the rectangle.

The period shown in FIG. 16 and the period shown in FIG. 17 match with the period with the quantization condition A shown in FIG. 10A and the period with the quantization condition B shown in FIG. 10B, respectively. As described above, on both of the quantization conditions of FIG. 10A and FIG. 10B, the quantization value "1" (in the case of binary, "0" or "1") is likely to align in the arrangement of the gray squares in the figures. In view of this, for example, in the case of the block with the quantization condition A in the superimposition of digital watermark information, the quantization value "1" is likely to align in the period of FIG. 10A, and filtering by using a matching filter A further amplifies its frequency component. In addition, if a converted value is thinned in the period shown in FIG. 16 and added, a dispersion value B[0] of the addition results for respective phases increases. That is, variations increase. On the other hand, if filtering by using a not matching spatial filter B is applied to the block on which processing with the quantization condition A is performed, and also thinning is performed in the period shown in FIG. 17, a dispersion value of the addition results of the converted values decreases. That is, since the period in quantization and the period in thinning are different, addition values of the converted values with different thinning phases move toward an average value, and variations decrease. In the same manner, in the case of the block with the quantization condition B in the superimposition of digital watermark information, in the thinning in the period shown in FIG. 16, a dispersion value B[1] decreases, whereas in the thinning in the period shown in FIG. 17, a dispersion value B[1] increases.

As described above with reference to FIG. 8, bit=0 is set for the quantization condition A, and bit=1 is set for the quantization condition B. Accordingly, if a dispersion value obtained with respect to the period No. 0 is large, the object pixel is determined to be a pixel on which a digital watermark is superimposed with the quantization condition A of bit=0. If a dispersion value obtained with respect to the period No. 1 is large, the object pixel is determined to be a pixel on which a digital watermark is superimposed with the quantization condition B of bit=1.

It should be noted that by associating the quantization conditions, the spatial filter characteristics, and the periods of thinning conditions as described above, it is possible to superimpose and separate (detect) digital watermark information. Further, in the above embodiment, without comparing power spectrums of frequencies corresponding to the rules of the quantization conditions by orthogonal transform, it is possible to easily separate a code of a digital watermark. In addition, it is possible to achieve separation processing at relatively high speed due to processing in a real space area.

In step S1410 of FIG. 15, as described above, a variable Diff, that is, a difference between the two dispersion values B[0] and B[1], is calculated. The boundary estimation part 1011 (FIG. 11) estimates a boundary between blocks on which digital watermark information is superimposed based on the variable Diff. This will be described in the following.

Figure 18:
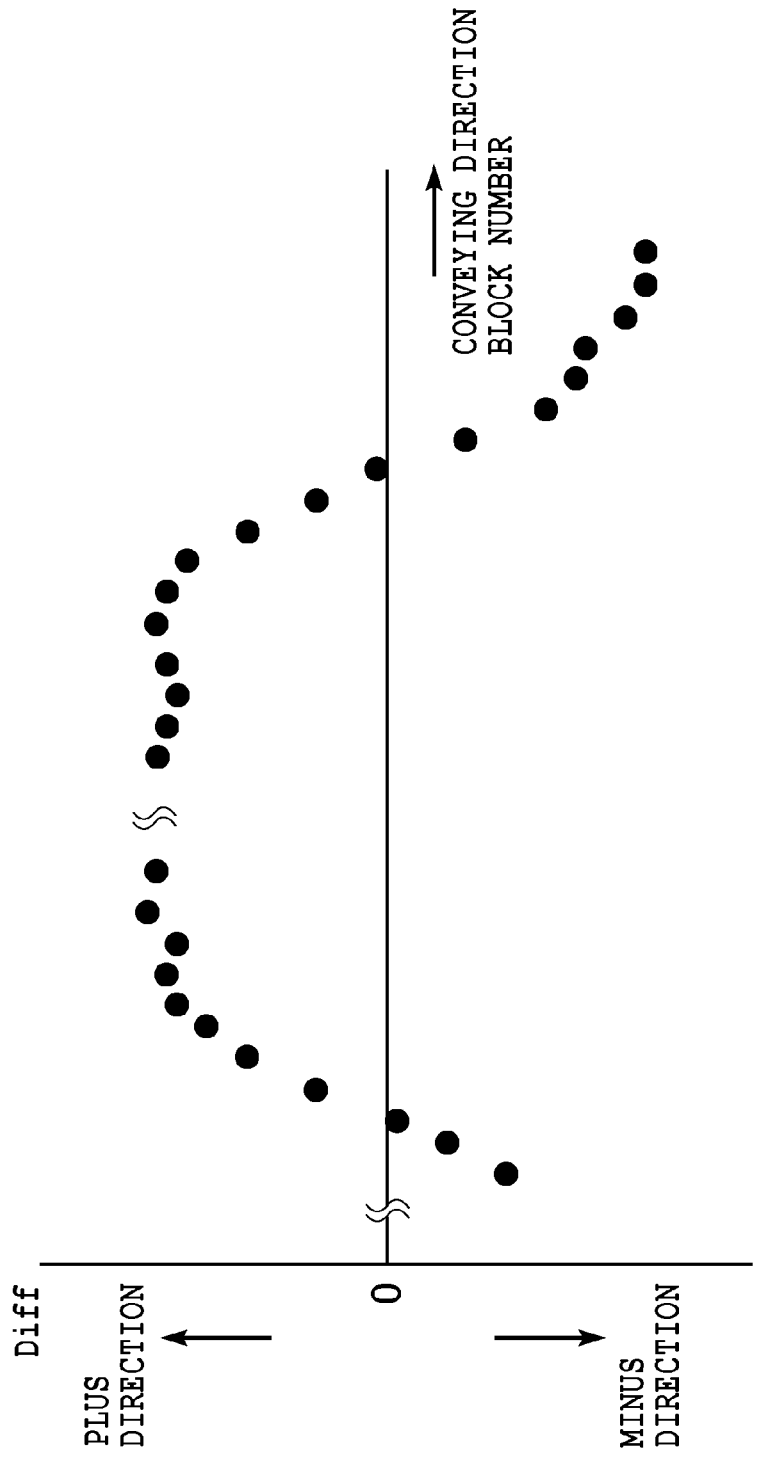
FIG. 18 is a plot showing exemplary change in a variable Diff for each block according to the present embodiment.

FIG. 18 is a graph showing exemplary change in the variable Diff for each block according to the present embodiment. In FIG. 18, a lateral axis shows a number of a blocked block in a conveying direction and a longitudinal axis shows a value of Diff. In FIG. 18, a point shown by a black circle represents Diff of each block number. As described above, the variable Diff represents the likelihood of a code obtained by decoding of each block. As is apparent from FIG. 12, if a block consisting of P pixels×Q pixels used for decoding is included in a block consisting of N pixels×M pixels in printing, there is a greater likelihood that the decoded code is either 0 or 1. On the other hand, if a block consisting of P pixels×Q pixels is not included in the block consisting of N pixels×M pixels, and a plurality of block pixels across a boundary between blocks in printing is referred to, the values of the above-described dispersion values B[0] and B[1] get closer and the value of the variable Diff gets close to 0. Further, if the block consisting of P pixels×Q pixels exceeds the boundary between blocks in printing, the value of the variable Diff exceeds 0 and its sign is reversely switched. Accordingly, it can be estimated that a pixel position of a variable Diff of 0 is a boundary between blocks on which digital watermark information is superimposed in printing.

It should be noted that there may be various methods for estimating a position in which a variable Diff may be 0. Examples of the method include a method for estimation by linear interpolation from two points at which a value of the variable Diff switches from positive to negative or from negative to positive, a method for estimation by using higher-order interpolation from a plurality of values of the variable Diff at two or more points, a method for estimation by a known interpolation technique such as a Bezier curve or a spline curve, and the like.

After a block boundary can be estimated, a distance between block boundaries and deviation of the distance on the logical coordinates are evaluated. More specifically, as described above with reference to FIG. 4, if a movement amount of the estimated boundary is greater than a movement amount as a predetermined reference, it is detected that a conveyance speed has increased. On the other hand, if a movement amount of the estimated boundary is less than a movement amount as a predetermined reference, it is detected that a conveyance speed has decreased. Then, an amount of the change is sent to print control as a feedback.

Referring back to FIG. 6, a print control part 507 performs feedback control of an amount of change in the conveyance speed in a printing part. More specifically, a printing part 504 changes ejection timings as follows: if the conveyance speed has decreased, an ejection timing is delayed according to the amount of change, and if the conveyance speed has increased, an ejection timing is advanced. This control can achieve printing corresponding to the actual conveyance speed.

In the present embodiment, characteristics of the ink jet printing apparatus are effectively used. In the case of the ink jet printing apparatus, a shift or a landing displacement may occur in one ink dot. To precisely grasp an amount of conveyance, forming a detection mark by overlaying a plurality of dots rather than printing a detection mark with one dot can increase robustness of decoding. However, overlaying a plurality of dots makes the mark visually conspicuous and may cause poor image quality. Meanwhile, in the present embodiment, digital watermark information is superimposed on a lower frequency component (a predetermined band) than a quantization frequency by changing a threshold in pseudo gradation processing to increase power of a predetermined frequency so as to make the mark visually less conspicuous. Superimposition on the low-frequency component increases robustness. This is suitable for a printing apparatus in which a dot landing position is unstable, such as an ink jet printing apparatus. In the present embodiment, an example of the period as shown in FIG. 10A and FIG. 10B has been described. However, it is preferable that superimposition on what frequency be determined experimentally based on stability of the apparatus.

(Modification Example of First Embodiment)

Figure 19:
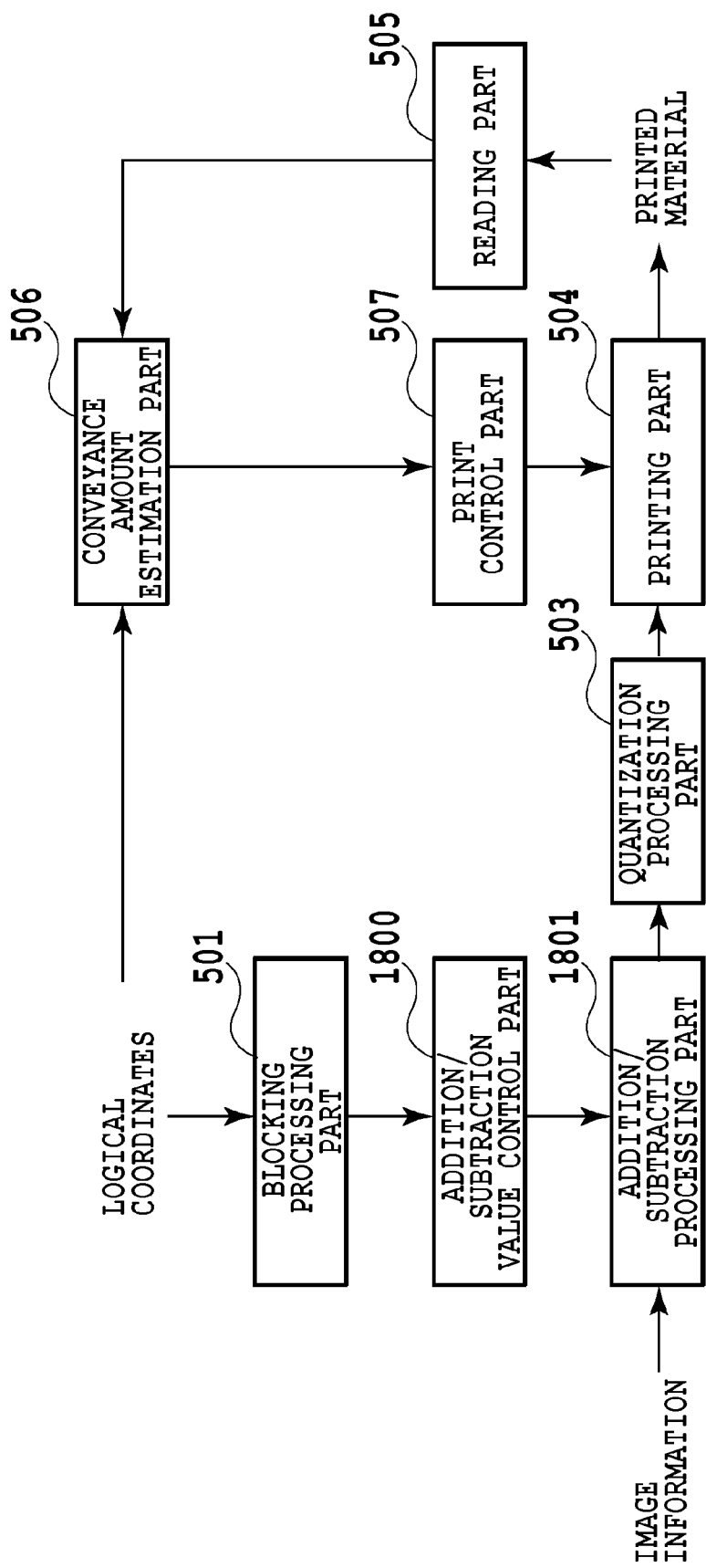
FIG. 19 is a block diagram showing a structure for printing with a digital watermark added and for feedback to a print control by analyzing information obtained by reading a result of the printing, according to a modification example of a first embodiment of the present invention.

FIG. 19 is a block diagram showing a configuration for printing with a digital watermark added and for feedback to a print control by analyzing information obtained by reading a result of the printing, according to a modification example of the first embodiment of the present invention. FIG. 19 is the same figure as the above-described FIG. 6, and only part of elements are different. The same reference signs are given to the same parts. Only the different features will be described.

Figure 20A:
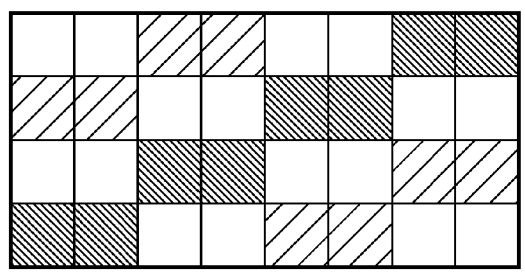
FIG. 20A and FIG. 20B are views illustrating differences in periods caused by adding or subtracting a predetermined value according to the above modification example.
Figure 20B:
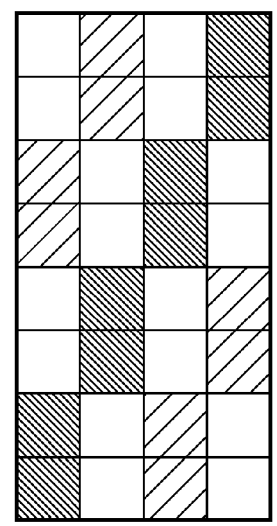

In the present modification example, without controlling a quantization threshold in the quantization processing part 503 shown in FIG. 6, digital watermark information is superimposed by adding or subtracting a predetermined value to or from a pixel value inputted to the quantization processing part 503 with a predetermined period. More specifically, in the blocking processing part 501, after blocking of a unit consisting of N pixels×M pixels, a pixel value is added or subtracted based on the predetermined periods shown in FIG. 20A and FIG. 20B. FIGS. 20A and 20B show two types of periods. An addition/subtraction value control part 1800 controls to switch between these two types of periods for each block. The processing procedure for switching is the same as the switching method for the quantization conditions described above with reference to FIG. 8. In FIGS. 20A and 20B, one square shows one pixel. In a gray square, a pixel value is added only by α, and in a square with oblique lines, a pixel value is subtracted only by a (addition/subtraction processing part 1801). The pixel value added/subtracted is quantized in the quantization processing part 503 and printed on the sheet (print medium). The processing procedure after printing is the same procedure as shown in FIG. 6.

According to the present modification example, a general-purpose quantization configuration may be used. This has an effect of producing a higher degree of flexibility in terms of installation. It is preferable that a value α to be added or subtracted be determined experimentally with consideration of visual characteristics for each ink.

(Second Embodiment)

Figure 21:
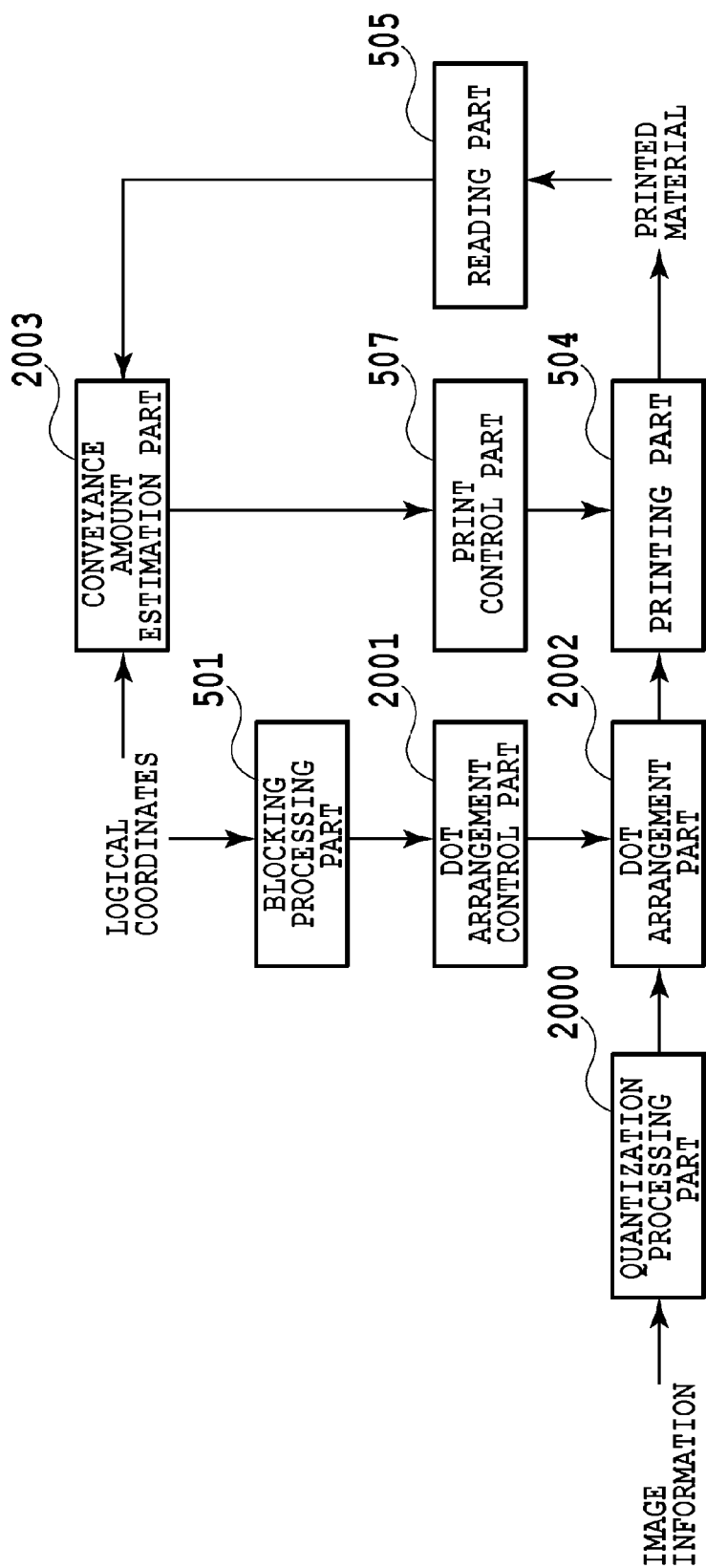
FIG. 21 is a block diagram showing a structure for printing with a digital watermark added and for feedback to a print control by analyzing information obtained by reading a result of the printing, according to a modification example of a second embodiment of the present invention.

FIG. 21 is a block diagram showing a configuration for printing with a digital watermark added and for feedback to a print control by analyzing information obtained by reading a result of the printing, according to a second embodiment of the present invention. FIG. 21 is the same figure as the above-described FIG. 6, and only part of elements are different. The same reference signs are given to the same parts. Only the different features will be described.

In FIG. 21, a quantization processing part 2000 performs pseudo gradation processing by error diffusion on inputted image data, so that the image data is converted into print data having levels less than the inputted gradation levels. The basic quantization processing is the same as the one described above with reference to FIG. 7. In the present embodiment, a description will be given of an example in which a quantized level is set to 17 levels.

A blocking processing part 501 performs blocking of image data in a unit consisting of N pixels in width and M pixels in height as shown in FIG. 9. A dot arrangement control part 2001 controls dot arrangement by a dot arrangement part 2002.

Figure 22A:
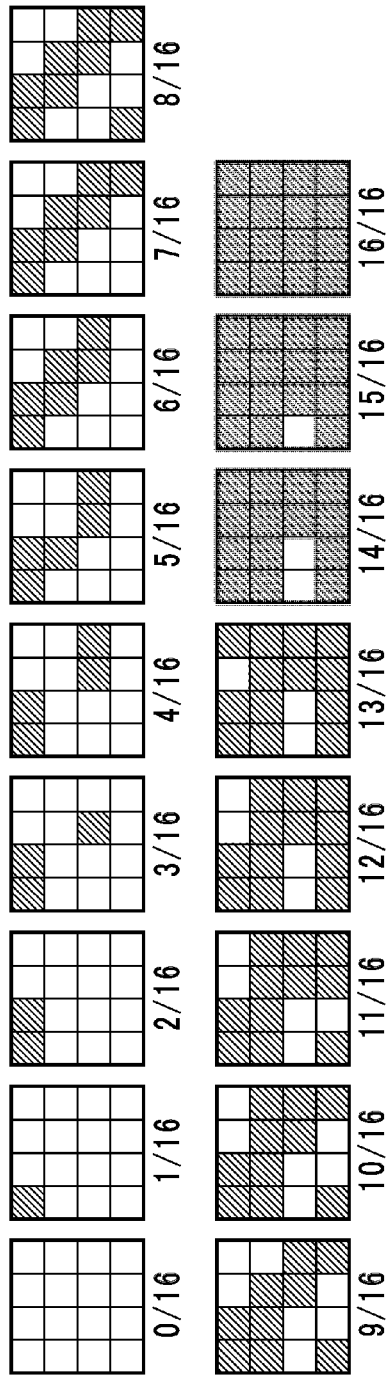
FIG. 22A and FIG. 22B are views showing dot arrangement patterns according to the second embodiment of the present invention.
Figure 22B:
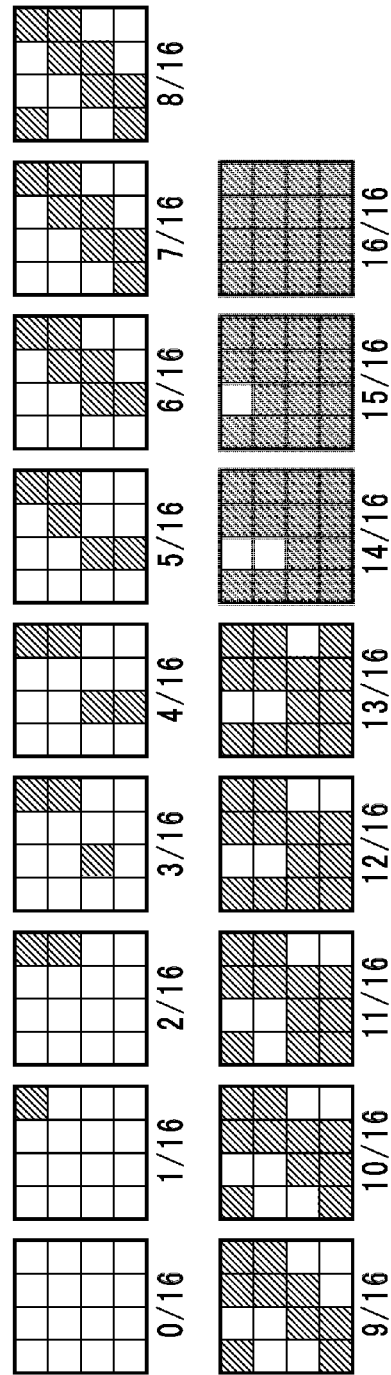

FIG. 22A and FIG. 22B are views showing dot arrangement patterns according to the second embodiment of the present invention. By using dot arrangement patterns, in a case where, for example, a print resolution is set to 2400 dpi (dot per inch) and a quantization resolution is set to 600 dpi, gradation expression may be used by the dot arrangement pattern of 4 pixels×4 pixels both in horizontal and vertical directions. FIGS. 22A and 22B show two examples of dot arrangement patterns corresponding to gradation of density patterns. In the pattern shown in FIG. 22A, as the density increases, dots tend to be connected diagonally from the left top to the right bottom. On the other hand, in the pattern shown in FIG. 22B, dots tend to be connected diagonally from the right top to the left bottom. The two types of patterns are used to be switched for each block. With respect to switching for each block, the same processing as the one described above with reference to FIG. 8 is used, in a manner that instead of the step of selecting a quantization condition, a step of selecting a dot arrangement pattern corresponding to a coordinate position may be performed.

Figures 23A, 23B:
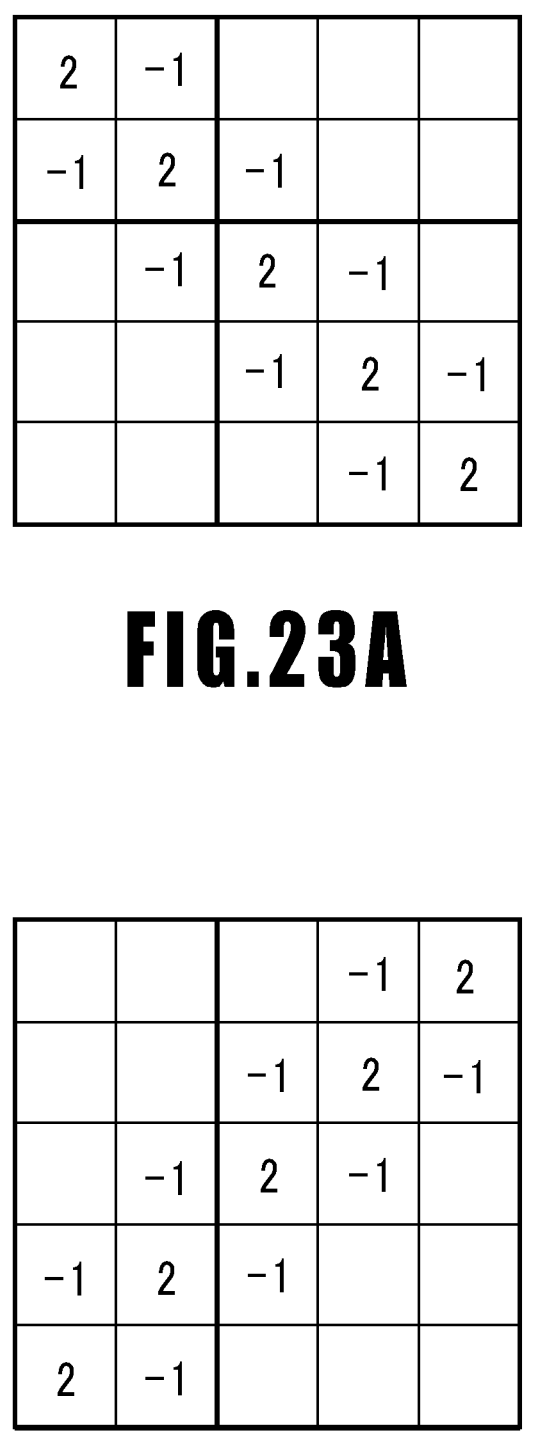

In FIG. 21, a printed material produced in the printing part 504 is transmitted to a conveyance amount estimation part 2003 as a reading result through a reading unit 505. The conveyance amount estimation part 2003 has the same configuration as the one shown in FIG. 11. FIG. 23A and FIG. 24 show an example of a spatial filter A 1003 and an example of a thinning part 1006 which correspond to the dot arrangement pattern of FIG. 22A, respectively. FIG. 23B and FIG. 25 show an example of a spatial filter B 1004 and an example of a thinning part B 1007 which correspond to the dot arrangement pattern of FIG. 22B, respectively.

Like the first embodiment, a boundary between blocks is estimated based on a value of a variable Diff calculated through the processing shown in FIG. 15, and a moving distance between the block boundaries is calculated so that an amount of change in conveyance speed is estimated. The estimated amount of change in conveyance speed as a feedback is sent to ejection timing control in a print control part 507.

According to the present embodiment, digital watermark information is superimposed on a higher frequency component than that in the first embodiment. Accordingly, an image sensor to be used needs to have a resolution higher than that in the first embodiment. Instead, noise dependent on switching of a density pattern is hardly visually recognized, and poor image quality can further be reduced.

(Modification Example of Second Embodiment)

Figure 26A:
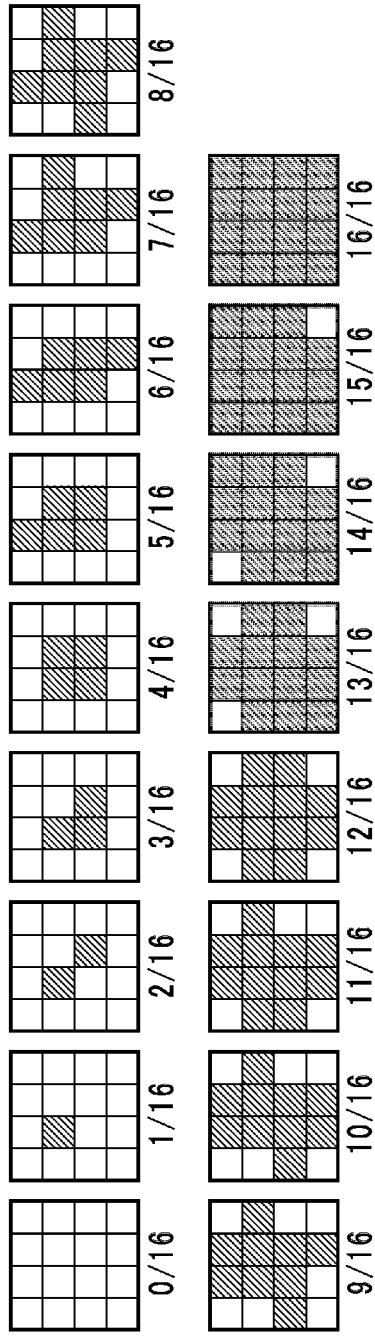
FIG. 26A and FIG. 26B are views showing dot arrangement patterns according to a modification example of the second embodiment of the present invention.
Figure 26B:
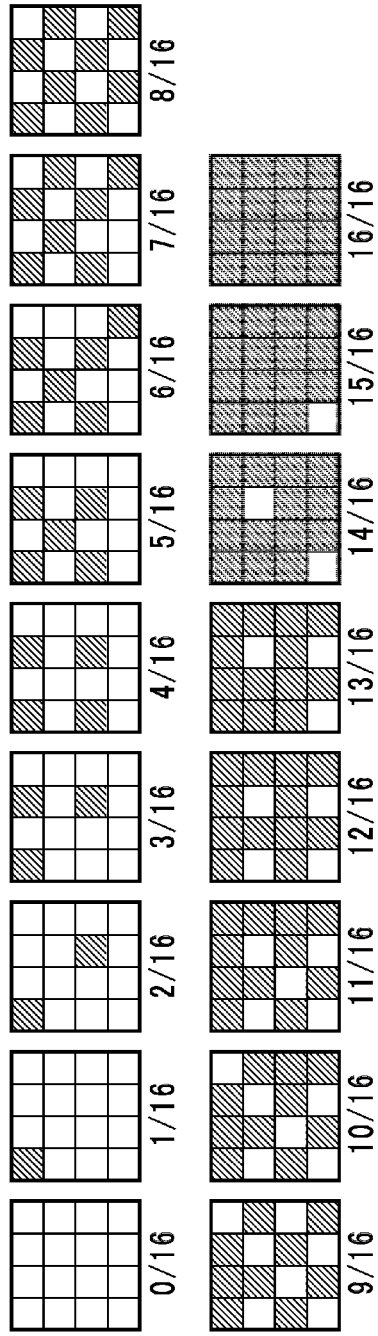

FIG. 26A and FIG. 26B show dot arrangement patterns according to a modification example of the second embodiment of the present invention, and show combinations of dot arrangement patterns that are different from those shown in FIG. 22A and FIG. 22B. FIG. 26A is an example of a concentration-type dot arrangement pattern, and FIG. 26B is an example of a dispersion-type dot arrangement pattern. In the combinations of patterns shown in FIGS. 22A and 22B, image analysis is performed with respect to a difference in orientation of a dot arrangement pattern for decoding of a digital watermark. The present modification example uses a difference in images obtained by reading the respective patterns shown in FIGS. 26A and 26B by using an image sensor having a low resolution. As apparent from a known tint block pattern printing technique (for example, Japanese Patent Laid-Open No. 2004-223854), even with patterns expressed with the same density on the sheet, images outputted from the image sensor may greatly vary due to different space frequencies. More specifically, in a case where an image is read by an image sensor having a frequency lower than a print frequency on the sheet, a brightness signal can be faithfully reproduced in the state of a so-called large dot in which a plurality of dots are concentrated. Meanwhile, in the case of a so-called small dot in which a plurality of dots are present in a dispersed manner, a brightness level of each sensor increases unfortunately, and a phenomenon called an image void may occur. For example, at a print resolution of 2400 dpi, image information inputted at a scan resolution of 600 dpi produces a large difference between arrangement patterns of FIG. 26A and FIG. 26B. As a result, a mark printed is invisible to human eyes, but in the image itself read by the image sensor, a mark can be clearly identified.

The modification example uses this phenomenon, so that a block boundary can be determined only based on a read output from the image sensor without performing complicated image analysis of a digital watermark. More specifically, an output value of the image sensor is accumulated, a change in the output value is calculated by using a space differential filter, which is a known edge extraction configuration, with respect to adjacent pixels, and the change is compared with a predetermined threshold experimentally set in advance, whereby a block boundary is determined. Since the block boundary is an artificial geometric edge, calculating changes at a plurality of portions to synthetically evaluate a boundary shape can easily distinguish the block boundary from an edge in a natural image.

According to the modification example, the simple processing allows estimation of an amount of conveyance at very high speed. Also in the present modification example, by calculating a distance between the estimated block boundaries, an actual amount of conveyance is estimated. The processing procedure of evaluating an estimated amount of conveyance and deviation of the distance on the logical coordinates and sending the resultant to an ejection timing as a feedback is performed in the same manner as in the above-described embodiments.

(Other Embodiment)

A description has been given of the mode of superimposing and printing digital watermark information, specifying coordinates by reconstituting the digital watermark information, and correcting a change in conveyance speed. It should be noted that a digital watermarking technique other than the above-described technique may also be used. There may be various modification examples, such as an example in which part of conditions at the time of printing an image are changed and the changed portion is set as watermark information, or an example in which a frequency or a color that is not easily visually recognized is used. Further, an ejection timing has been described as a feedback item to be corrected, but an amount of conveyance of a sheet itself may also be controlled.

Figure 27A:
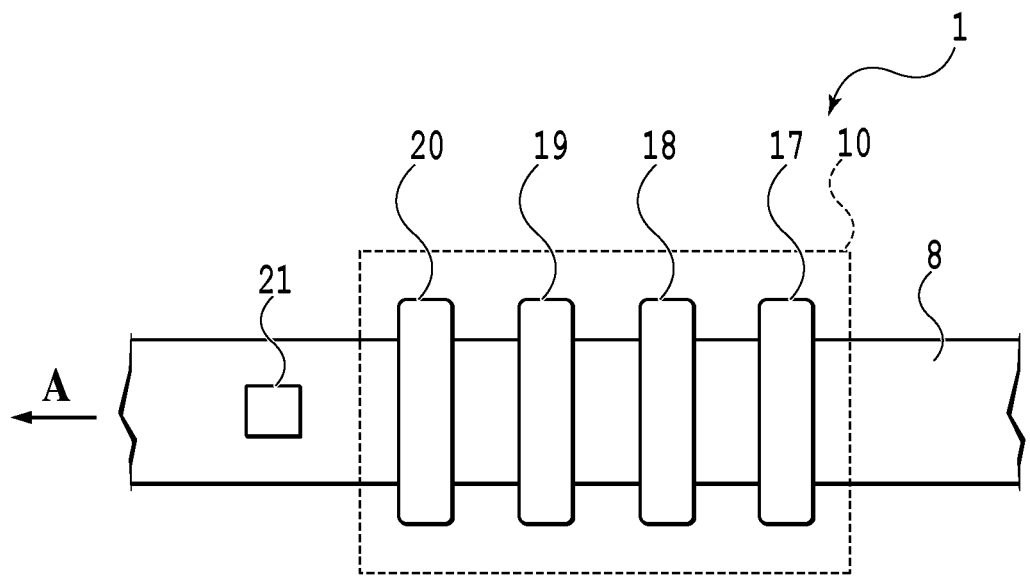
FIG. 27A and FIG. 27B are a top view and a side view, respectively, showing a structure according to another embodiment of the printing part of FIG. 1.
Figure 27B:
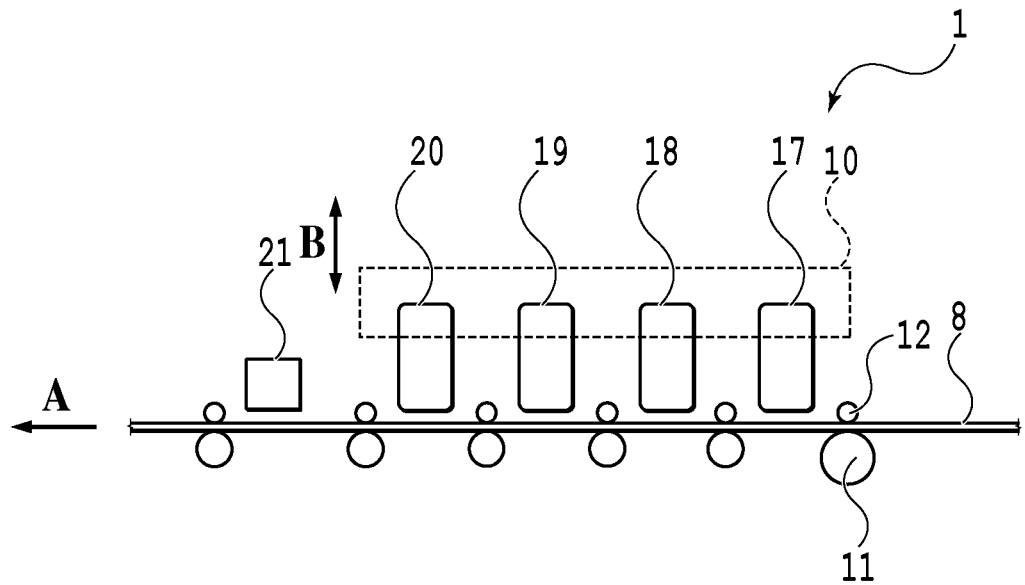

Furthermore, in the above embodiments, examples of superimposing a digital watermark only on an image of yellow ink have been described. However, the above-described digital watermarking system of the present invention may embed a digital watermark into image information of ink having a high visual sensitivity other than the yellow ink without a strange visual feeling. That is, the sensor shown in FIG. 2A and FIG. 2B is located downstream of the print head of the yellow ink and upstream of the print heads of other inks. However, the position of the sensor is not limited to this. FIG. 27A and FIG. 27B show a modification example of the structure shown in FIG. 2A and FIG. 2B. In FIG. 27A and FIG. 27B, the same reference signs are given to the parts corresponding to those shown in FIG. 2A and FIG. 2B. The description of the same parts will be omitted. In the structure of FIG. 27A and FIG. 27B, a sensor unit 21 is located downstream of all of the print heads. In this structure, superimposing a digital watermark only on yellow ink causes other ink to be ejected before an image on the sheet is inputted to an image sensor, and decoding becomes difficult. In this respect, digital watermark information is superimposed on an image of all ink colors. In this case, an ejection timing for each ink is changed based on a change in conveyance speed estimated for each ink color. Further, as the structure shown in FIG. 27A and FIG. 27B, if the image sensor is located downstream of all of the print heads, various kinds of detection processing, such as non-ejection detection or ejection amount detection of ink, may be used concurrently with correction of an amount of conveyance by the sensor.

Furthermore, in the above embodiments, a description has been given of the ink jet printing apparatus by way of example. However, the present invention is also applicable to a printing system other than the ink jet printing apparatus by sending a feedback to control of a print start position or control of a conveyance speed, not an ink ejection timing.

Furthermore, the printing system of the above embodiments uses a line-type print head in which nozzles are arranged corresponding to the width of a conveyed print medium. However, application of the present invention is not limited to this system. For example, a serial system may be used for printing in which scanning of a print medium is performed by a print head, and ink is ejected from the nozzles during the scanning.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-154964 filed Jul. 30, 2014, which is hereby incorporated by reference wherein in its entirety.

What is claimed is:

1. A printing apparatus for conveying a print medium and performing printing on the conveyed print medium, the printing apparatus comprising:
a print data acquisition unit configured to acquire print data in which digital watermark information is added to image data, the digital watermark information being used to identify a position of an image of the image data on a print medium and being added to the image data for each of a plurality of blocks arranged according to coordinates of the position;
a printing unit configured to print the image on the print medium in accordance with the print data acquired by the print data acquisition unit;
a conveyance information acquisition unit configured to acquire information relating to conveyance of the print medium, based on information on the position of the image printed by the printing unit that is obtained by detection of the digital watermark information in the image printed by the printing unit which is read by a reading unit; and
a print control unit configured to control printing by the printing unit, based on the acquired information relating to conveyance,
wherein the watermark information is added to the image data with changing printing conditions, each of which is used for printing the watermark information, for each of the plurality of blocks.

2. The printing apparatus according to claim 1, wherein the printing condition is an arrangement of thresholds in the image when quantizing image data.

3. The printing apparatus according to claim 1, wherein the printing condition is a dot arrangement pattern for specifying arrangement of dots to be printed, the dot arrangement pattern corresponding to a gradation value shown by the print data.

4. The printing apparatus according to claim 3, wherein the dot arrangement pattern is used to be changed between a first arrangement pattern in which dots are concentrated and a second arrangement pattern in which dots are dispersed as compared to the first arrangement pattern, for each of the plurality of blocks.

5. The printing apparatus according to claim 1, wherein the printing condition is a period with which addition or subtraction of a predetermined value is performed for a pixel value of the image data.

6. The printing apparatus according to claim 1, wherein the print data acquisition unit acquires the print data to which the digital watermark information is added, which causes the print data to generate a larger power spectrum in a predetermined band as compared to a power spectrum of the print data before the digital watermark information is added.

7. The printing apparatus according to claim 1, further comprising the reading unit configured to read the image printed on the print medium.

8. A printing apparatus for conveying a print medium and performing printing on the conveyed print medium, the printing apparatus comprising:
a print data acquisition unit configured to acquire print data in which digital watermark information is added to image data, the digital watermark information being used to identify a position of an image of the image data on a print medium;
a printing unit configured to print the image on the print medium in accordance with the print data acquired by the print data acquisition unit;
a conveyance information acquisition unit configured to acquire information relating to conveyance of the print medium, based on information on the position of the image printed by the printing unit that is obtained by detection of the digital watermark information in the image printed by the printing unit which is read by a reading unit; and
a print control unit configured to control printing by the printing unit, based on the acquired information relating to conveyance,
wherein the print data acquisition unit acquires the print data to which the digital watermark information is added, which causes the print data to generate a larger power spectrum in a predetermined band as compared to a power spectrum of the print data before the digital watermark information is added, and
the conveyance information acquisition unit acquires the information relating to conveyance by comparing power spectrums in a plurality of predetermined bands.

9. The printing apparatus according to claim 8, wherein at least one of the predetermined bands is a band with a lower frequency than a quantization frequency.

10. A print control method for a printing apparatus for conveying a print medium and performing printing on the conveyed print medium, the print control method comprising:
a print data acquisition step of acquiring print data in which digital watermark information is added to image data, the digital watermark information being used to identify a position of an image of the image data on a print medium and being added to the image data for each of a plurality of blocks arranged according to coordinates of the position;
a printing step of printing the image on the print medium in accordance with the print data acquired in the print data acquisition step;
a conveyance information acquisition step of acquiring information relating to conveyance of the print medium, based on information on the position of the image printed by the printing step that is obtained by detection of the digital watermark information in the image printed by the printing step which is read by a reading unit; and a print control step of controlling printing in the printing step, based on the acquired information relating to conveyance, wherein the watermark information is added to the image data with changing printing conditions, each of which is used for printing the watermark information, for each of the plurality of blocks.

11. The print control method according to claim 10, wherein the printing condition is an arrangement of thresholds in the image when quantizing image data.

12. The print control method according to claim 10, wherein the printing condition is a dot arrangement pattern for specifying arrangement of dots to be printed, the dot arrangement pattern corresponding to a gradation value shown by the print data.

13. The print control method according to claim 12, wherein the dot arrangement pattern is used to be changed between a first arrangement pattern in which dots are concentrated and a second arrangement pattern in which dots are dispersed as compared to the first arrangement pattern, for each of the plurality of blocks.

14. The print control method according to claim 10, wherein the printing condition is a period with which addition or subtraction of a predetermined value is performed for a pixel value of the image data.

15. The print control method according to claim 10, wherein the print data acquisition step acquires the print data to which the digital watermark information is added, which causes the print data to generate a larger power spectrum in a predetermined band as compared to a power spectrum of the print data before the digital watermark information is added.

16. The print control method according to claim 15, wherein the conveyance information acquisition step acquires the information relating to conveyance by comparing power spectrums in a plurality of predetermined bands.

17. The print control method according to claim 15, wherein at least one of the predetermined bands is a band with a lower frequency than a quantization frequency.

* * * * *